(12) United States Patent
Nishira et al.

(10) Patent No.: US 8,090,537 B2
(45) Date of Patent: Jan. 3, 2012

(54) OBSTACLE AVOIDANCE PATH COMPUTING APPARATUS, OBSTACLE AVOIDANCE PATH COMPUTING METHOD, AND OBSTACLE AVOIDANCE CONTROL SYSTEM EQUIPPED WITH OBSTACLE AVOIDANCE PATH COMPUTING SYSTEM

(75) Inventors: Hikaru Nishira, Yokohama (JP); Yoshitaka Deguchi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 1206 days.

(21) Appl. No.: 11/760,936

(22) Filed: Jun. 11, 2007

(65) Prior Publication Data
US 2007/0288133 A1 Dec. 13, 2007

(30) Foreign Application Priority Data
Jun. 13, 2006 (JP) .................................. 2006-163332

(51) Int. Cl.
*G08G 1/16* (2006.01)
(52) U.S. Cl. ......... 701/301; 701/300; 340/436; 340/903
(58) Field of Classification Search .................... 701/23, 701/300–301; 340/436, 903
See application file for complete search history.

(56) References Cited

U.S. PATENT DOCUMENTS

| | | | | |
|---|---|---|---|---|
| 5,235,316 A * | 8/1993 | Qualizza | ........................ | 340/436 |
| 6,026,347 A * | 2/2000 | Schuster | ........................ | 701/301 |
| 6,259,992 B1 * | 7/2001 | Urai et al. | ........................ | 701/301 |
| 6,820,007 B2 * | 11/2004 | Abe et al. | ........................ | 701/301 |
| 7,212,901 B2 * | 5/2007 | Sadano et al. | ................... | 701/70 |
| 7,409,279 B2 * | 8/2008 | Sugano et al. | ................... | 701/70 |
| 7,424,357 B2 * | 9/2008 | Ozaki et al. | ...................... | 701/70 |
| 7,444,224 B2 * | 10/2008 | Sadano et al. | ................... | 701/80 |
| 7,734,416 B2 * | 6/2010 | Yano et al. | ...................... | 701/301 |
| 7,949,469 B2 * | 5/2011 | Hattori et al. | .................. | 701/301 |
| 2004/0098187 A1 * | 5/2004 | Nakao | .............................. | 701/80 |

(Continued)

FOREIGN PATENT DOCUMENTS
JP 2000-128007 5/2000
(Continued)

OTHER PUBLICATIONS

An Intelligent Collision Avoidance Planning Of A Robot Manipulator Whose Workspace Incl udes Moving Objects; Baba, N.; Intelligent Robots, 1988., IEEE International Workshop on; Digital Object Identifier: 10.1109/IROS.1988.593316 Publication Year: 1988 , pp. 329-333.*

(Continued)

*Primary Examiner* — Cuong H Nguyen
(74) *Attorney, Agent, or Firm* — Global IP Counselors, LLP

(57) ABSTRACT

An obstacle avoidance path computing apparatus is provided with a preceding object detecting section, a host vehicle information detecting section, a preceding object arrival region estimating section and a preceding object avoidance path setting section. The preceding object detecting section detects a preceding object. The host vehicle information detecting section detects host vehicle information. The preceding object arrival region estimating section calculates an estimated arrival region within which the preceding object could arrive after a prescribed amount of time has elapsed since the preceding object was detected, based on an estimated attribute of the preceding object from the preceding object information. The preceding object avoidance path setting section calculates an avoidance path that will not encroach on the estimated arrival region based the preceding object information and the host vehicle information.

22 Claims, 16 Drawing Sheets

U.S. PATENT DOCUMENTS

| | | | |
|---|---|---|---|
| 2004/0193374 A1* | 9/2004 | Hac et al. | 701/301 |
| 2005/0096827 A1* | 5/2005 | Sadano et al. | 701/70 |
| 2005/0203705 A1* | 9/2005 | Izumi et al. | 701/301 |
| 2006/0282218 A1* | 12/2006 | Urai et al. | 701/301 |
| 2007/0129891 A1* | 6/2007 | Yano et al. | 701/301 |
| 2007/0288133 A1* | 12/2007 | Nishira et al. | 701/23 |

FOREIGN PATENT DOCUMENTS

| | | |
|---|---|---|
| JP | 2002-260192 | 9/2002 |
| JP | 2004-155241 A1 | 6/2004 |
| JP | 2004-171391 | 6/2004 |
| JP | 2004-268829 | 9/2004 |
| JP | 2005324699 A * | 11/2005 |
| JP | 2006-039698 | 2/2006 |
| JP | 2008121583 A * | 5/2008 |
| JP | 2008308126 A * | 12/2008 |
| JP | 2009015547 A * | 1/2009 |
| JP | 2010097400 A * | 4/2010 |
| JP | 2010181928 A * | 8/2010 |
| JP | 2011113511 A * | 6/2011 |

OTHER PUBLICATIONS

Behavior dynamics of collision-avoidance in motion planning of mobile robots; Xing-Jian Jing; Da-Long Tan; Yue-Chao Wang; Intelligent Robots and Systems, 2004. (IROS 2004). Proceedings. 2004 IEEE/RSJ International Conference on; vol. 2 Digital Object Identifier: 10.1109/IROS.2004.1389628; Publication Year: 2004, pp. 1624-1629 vol. 2.*

Local action planning for mobile robot collision avoidance; Belker, T.; Schulz, D.; Intelligent Robots and Systems, 2002. IEEE/RSJ International Conference on; vol. 1; Digital Object Identifier: 10.1109/IRDS.2002.1041457 Publication Year: 2002, pp. 601-606 vol. 1.*

Combining haptic human-machine interaction with predictive path planning for lane-keeping and collision avoidance systems Brandt, T.; Sattel, T.; Bohm, M.; Intelligent Vehicles Symposium, 2007 IEEE; Digital Object Identifier: 10.1109/IVS.2007.4290178; Publication Year: 2007, pp. 582-587.*

Reactive path planning with collision avoidance in dynamic environments; Achour, N.; M'Sirdi, N.K.; Toumi, R.; Robot and Human Interactive Communication, 2001. Proceedings. 10th IEEE International Workshop on; Digital Object Identifier: 10.1109/ROMAN.2001.981879; Publication Year: 2001, pp. 62-67.*

Combining Collision Avoidance and Operator Workload Reduction with Cooperative Task Assignment and Path Planning Saunders, J.B.; Rasmussen, S.J.; Schumacher, C.J.; American Control Conference, 2007. ACC '07; Digital Object Identifier: 10.1109/ACC.2007.4282738; Publication Year: 2007, pp. 3898-3903.*

Reactive collision avoidance of multiple moving agents by cooperation and conflict propagation; Krishna, K.M.; Hexmoor, H.; Robotics and Automation, 2004. Proceedings. ICRA '04. 2004 IEEE International Conference on; vol. 3; Digital Object Identifier: 10.1109/ROBOT.2004.1307379; Publication Year: 2004, pp. 2141-2146 vol. 3.*

Vision-based local multi-resolution mapping and path planning for Miniature Air Vehicles; Huili Yu; Beard, R.W.; Byrne, J.; American Control Conference, 2009. ACC '09; Digital Object Identifier: 10.1109/ACC.2009.5160065; Publication Year: 2009, pp. 5247-5252.*

Designing PID and BELBIC controllers in path tracking and collision problem in automated highway systems; Jafarzadeh, S.; Mirheidari, R.; Motlagh, M.R.J.; Barkhordari, M.; Control, Automation, Robotics and Vision, 2008. ICARCV 2008. 10th Intern. Conf. on; Digital Object Id.: 10.1109/ICARCV.2008.4795757; Publ. Year: 2008, pp. 1562-1566.*

A novel potential field method for obstacle avoidance and path planning of mobile robot ; Lei Tang; Songyi Dian; Gangxu Gu; Kunli Zhou; Suihe Wang; Xinghuan Feng;Computer Science and Information Technology (ICCSIT), 2010 3rd IEEE International Conference on; vol. 9; Digital Object Id.: 10.1109/ICCSIT.2010.5565069; Pub. Year: 2010, pp. 633-637.*

An English translation of the Japanese Office Action of corresponding Japanese Application No. 2006-163332, dated May 30, 2011 and mailed Jun. 7, 2011.

* cited by examiner

OBSTACLE AVOIDANCE PATH COMPUTING APPARATUS, OBSTACLE AVOIDANCE PATH COMPUTING METHOD, AND OBSTACLE AVOIDANCE CONTROL SYSTEM EQUIPPED WITH OBSTACLE AVOIDANCE PATH COMPUTING SYSTEM

CROSS-REFERENCE TO RELATED APPLICATIONS

This application claims priority to Japanese Patent Application No. 2006-163332 filed on Jun. 13, 2006. The entire disclosure of Japanese Patent Application No. 2006-163332 is hereby incorporated herein by reference.

BACKGROUND OF THE INVENTION

1. Field of the Invention

The present invention generally relates to an obstacle avoidance control system and obstacle avoidance control method for enabling a vehicle to avoid an obstacle existing on a road on which the vehicle is traveling.

2. Background Information

Vehicle brake control systems have been proposed to determine the possibility of avoiding an obstacle existing in front of a host vehicle in which the system is employed and to control a host vehicle braking system applied to the host vehicle so as to avoid a collision. One example of such a vehicle brake control system is disclosed in Japanese Laid-Open Patent Publication No. 2004-155241. In this publication, it is also proposed that when the driver is operating the steering wheel, a generated braking force is reduced compared to the braking force that would be generated if the driver were not operating the steering wheel.

SUMMARY OF THE INVENTION

The avoidance control system described above is configured to execute the obstacle avoidance control based on the assumption that the movement velocity of the obstacle remains constant from the time when the obstacle was detected. However, since there is a certain range within which the speed of the detected obstacle could change, there is the possibility that even if the system determines that the obstacle can be avoided, the calculated and executed avoidance control will not prevent the vehicle from reaching the position of the obstacle.

The present invention was conceived in view of this issue in the above mentioned vehicle brake control system. One object of the present invention is to take velocity changes of the detected obstacle into account when determining if it is possible for the vehicle to avoid the obstacle and, thereby, to improve the accuracy of the avoidance control.

In order to achieve the object, an avoidance control system in accordance with the present invention is configured to estimate an estimated arrival region indicating the largest region within which a detected obstacle could possibly arrive after a prescribed amount of time has elapsed since the obstacle was detected, and to set an avoidance path contrived such that the vehicle in which the system is employed does not encroach on the estimated arrival region. In particular, the above mentioned object can basically be attained by providing an obstacle avoidance path computing apparatus that comprises a preceding object detecting section, a host vehicle information detecting section, a preceding object arrival region estimating section and a preceding object avoidance path setting section. The preceding object detecting section is configured to detect a preceding object state and a movement velocity of a preceding object existing in front of a host vehicle. The host vehicle information detecting section is configured to detect a host vehicle traveling state as host vehicle information. The preceding object arrival region estimating section is configured to calculate an estimated arrival region within which the preceding object could arrive after a prescribed amount of time has elapsed since the preceding object was detected, based on an estimated attribute of the preceding object from the preceding object state and the movement velocity of the preceding object. The preceding object avoidance path setting section is configured to calculate an avoidance path that will not encroach on the estimated arrival region based the preceding object information and the host vehicle information.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

Figure 10:
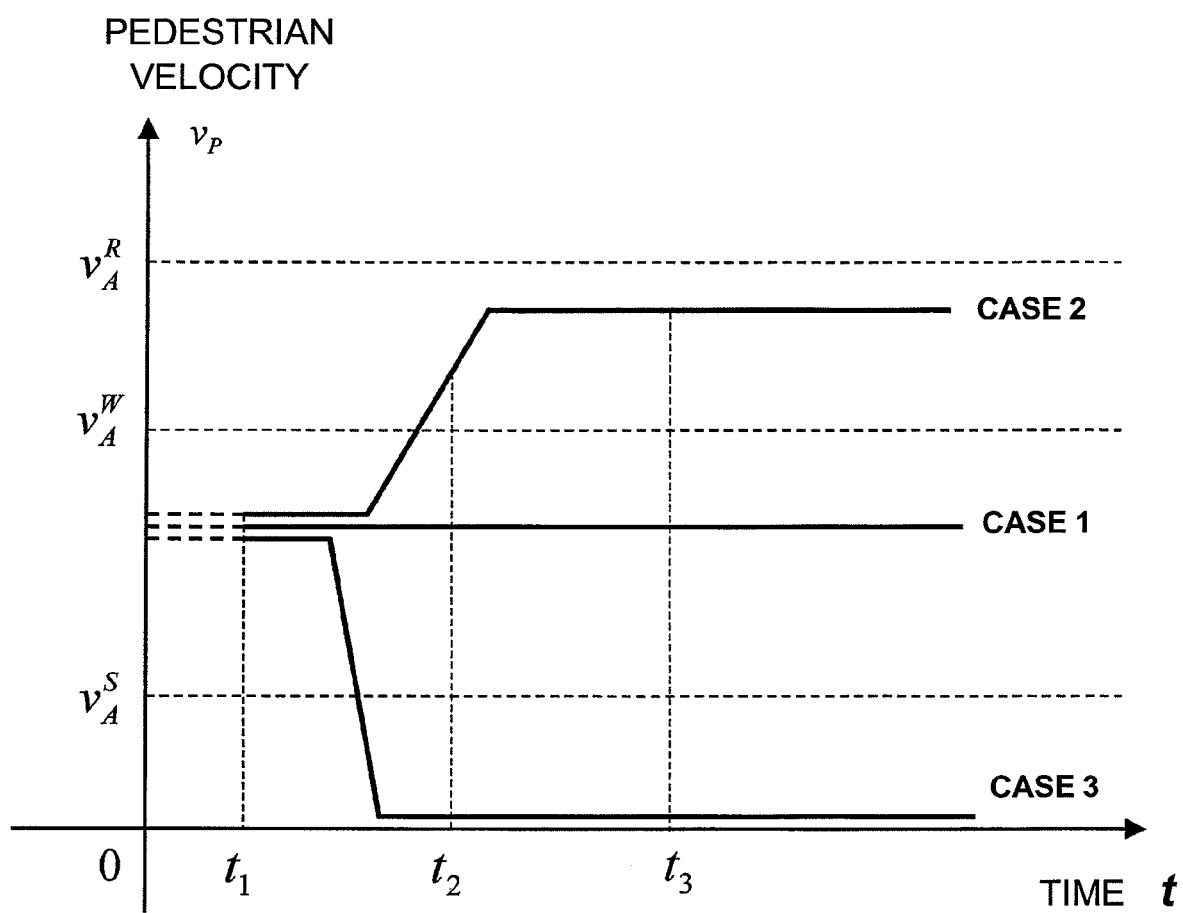
FIG. 10 is a graph illustrating how the movement state of the obstacle changes with time in each of three example cases.
Figure 13:
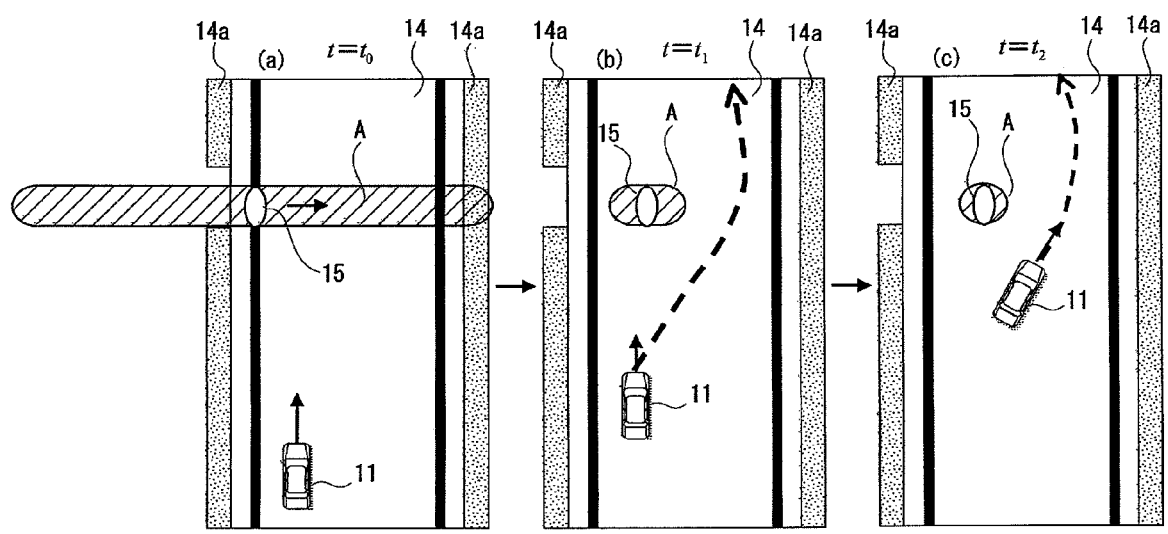
Figure 14:
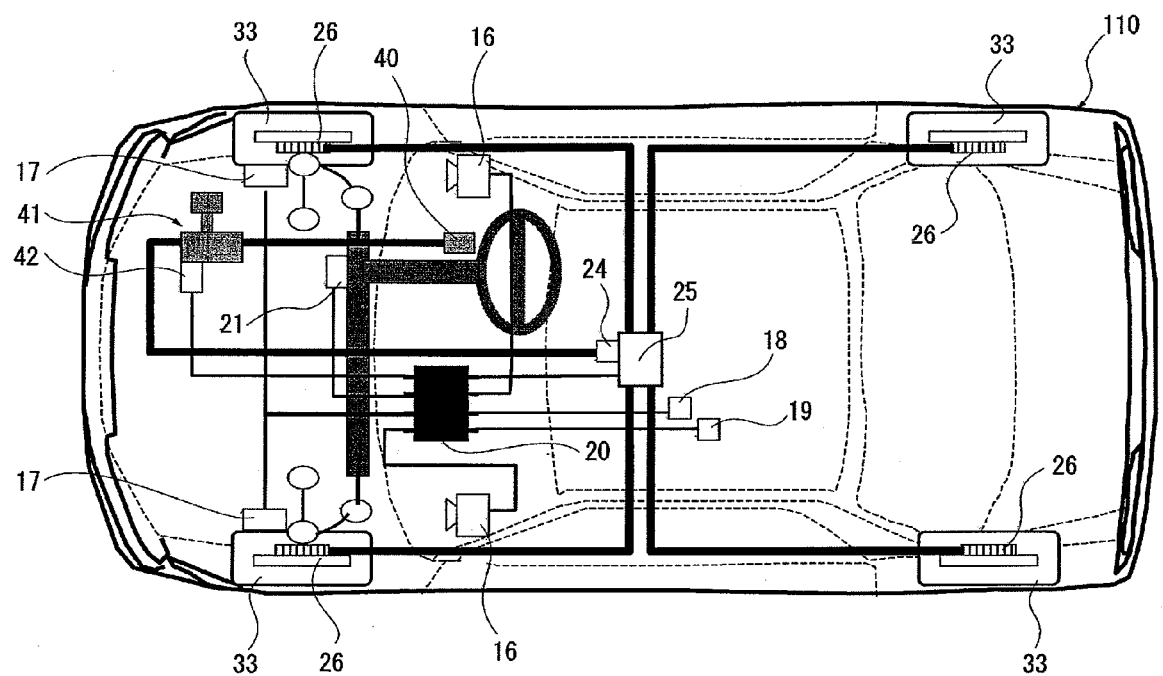
Figure 15:
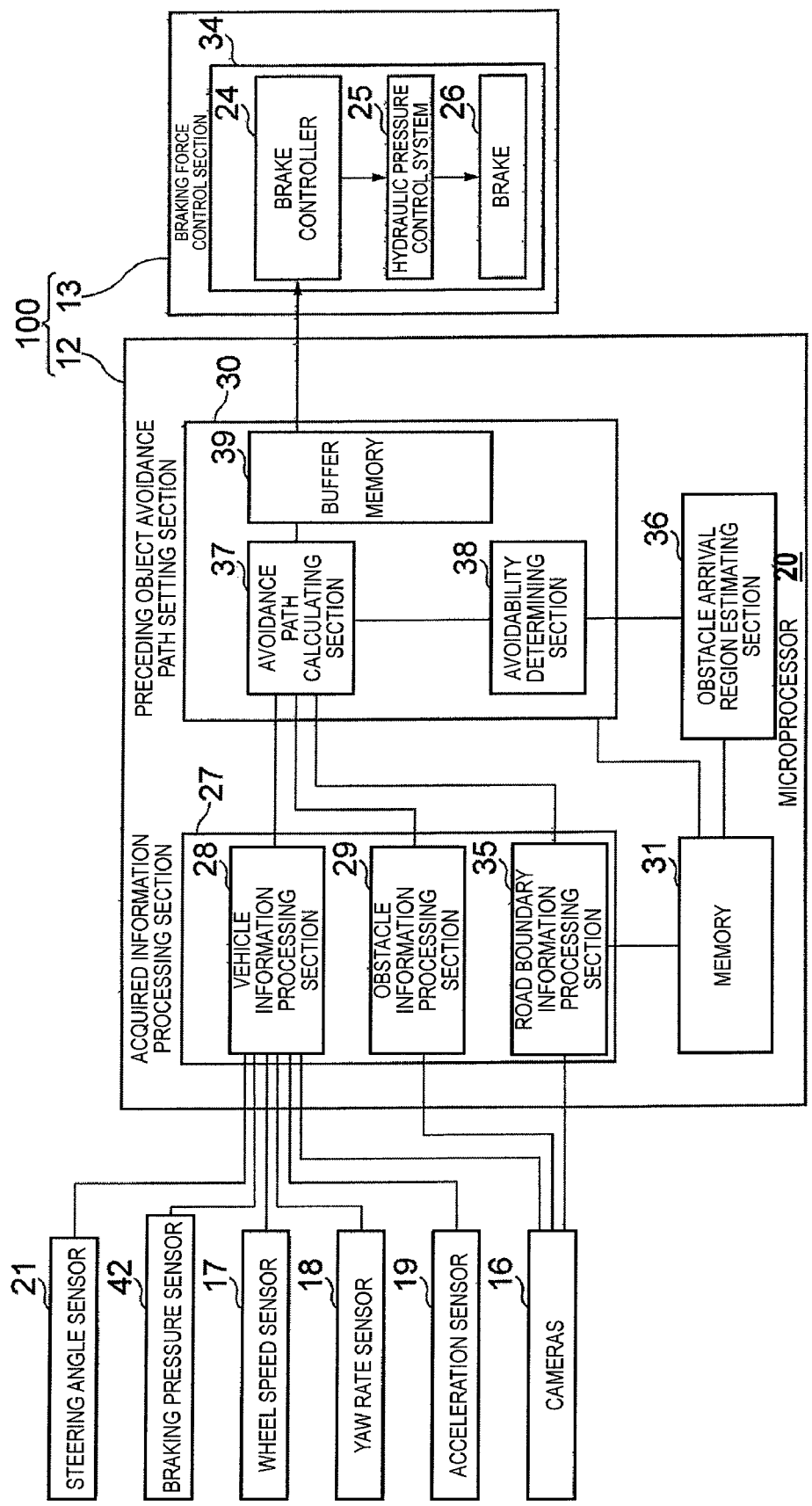
Figure 16:
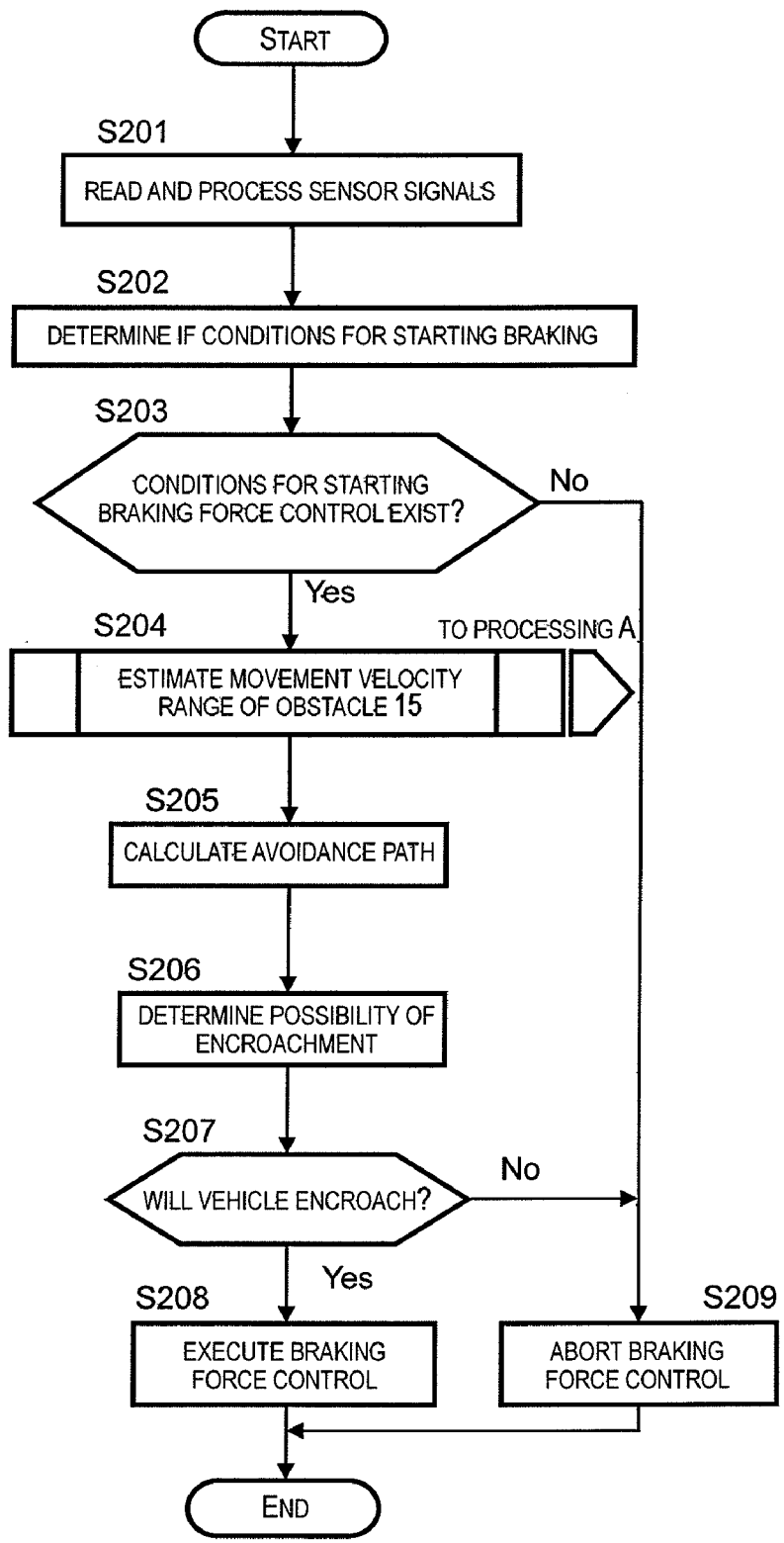
Figure 17:
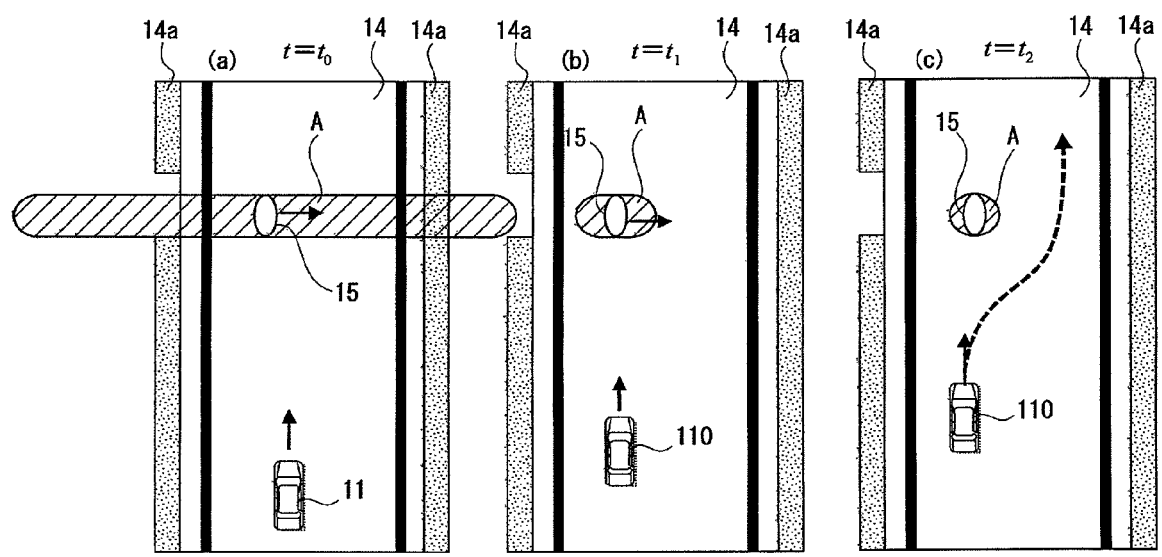

(detection time), illustration (b) showing the situation at the time t1, and illustration (c) showing the situation at the time t2;

FIG. 13 is a schematic top plan view of the host vehicle traveling on a road with notations illustrating Case 3 of FIG. 10, with illustration (a) showing the situation at the time t0 (detection time), illustration (b) showing the situation at the time t1, and illustration (c) showing the situation at the time t2;

FIG. 14 is a simple top plan view of a host vehicle that is schematically illustrated with a vehicle brake control system in accordance with a second embodiment of the present invention;

FIG. 15 is a block diagram of an obstacle avoidance control system in accordance with the second embodiment;

FIG. 16 is a flowchart showing the control processing executed by the avoidance actuation amount calculating unit of the second embodiment; and FIG. 17 is a schematic top plan view, similar to FIG. 13, of the host vehicle traveling on a road with notations for explaining the avoidance control executed by an avoidance control system in accordance with the second embodiment, with illustration (a) showing the situation at the time $t_0$, illustration (b) showing the situation at the time $t_1$, and illustration (c) showing the situation at the time $t_2$.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
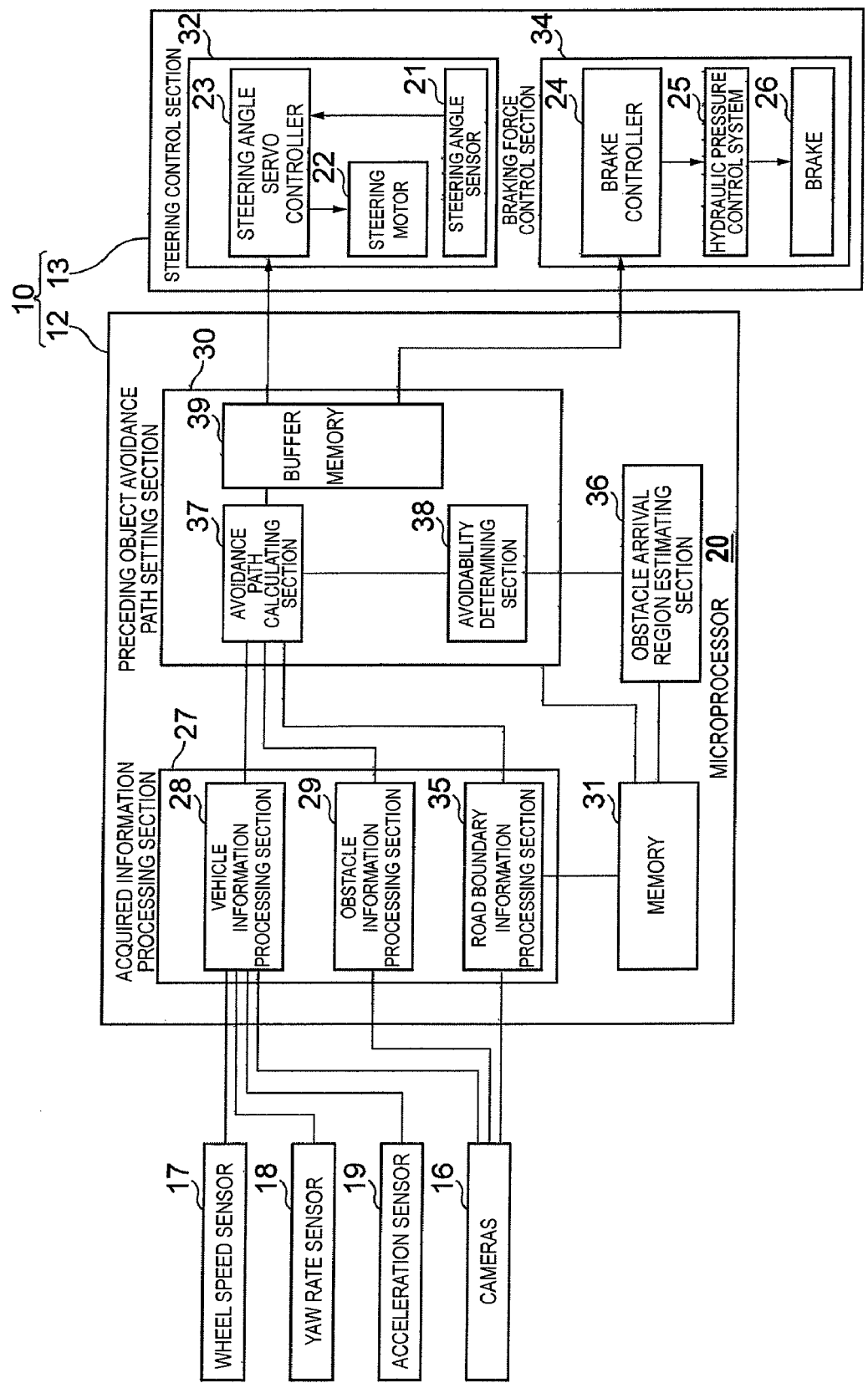
FIG. 1 is a block diagram of an obstacle avoidance control system for explaining the functional relationships of the components of a vehicle brake control system in accordance with a first embodiment of the present invention.

Referring initially to FIGS. 1 and 1, an obstacle avoidance control system 10 is illustrated in accordance with a first embodiment of the present invention. The obstacle avoidance control system 10 is installed in a vehicle 11 (hereinafter also called "the host vehicle") as seen FIG. 2 when in use. The obstacle avoidance control system 10 includes an obstacle avoidance actuation amount calculating unit 12 and a vehicle motion control unit 13. The obstacle avoidance actuation amount calculating unit 12 is configured to calculate a driving operation actuation amount that will enable the host vehicle 11 to avoid an obstacle or object 15 when the obstacle or object 15 is detected on the road 14 on which the host vehicle 11 is traveling as seen FIG. 2. The vehicle motion control unit 13 is configured to execute the driving operation actuation amount calculated by the avoidance actuation amount calculating unit 12 so as to cause the host vehicle 11 to avoid the obstacle 15. As explained below, with the obstacle avoidance control system 10, a predicted movement state of a detected obstacle or object 15 is estimated in order to obtain an estimated arrival region indicating the largest region within which the obstacle 15 could possibly arrive after a prescribed amount of time has elapsed, and an avoidance path is set such that the host vehicle 11 can avoid the estimated arrival region. As a result, the obstacle avoidability can be determined in a manner that accommodates changes in the detected velocity of the obstacle, and the accuracy of the obstacle avoidance control can be improved by making the host vehicle 11 follow the calculated avoidance path.

The host vehicle 11 is provided with a pair of cameras 16, a wheel speed sensor 17, a yaw rate sensor 18, an acceleration sensor 19, a microprocessor 20, a steering angle sensor 21, a steering motor 22, a steering angle servo controller 23, a brake controller 24, a hydraulic pressure control system 25 and a brake 26. In the first embodiment, the host vehicle 11 uses a rack and pinion type front wheel steering mechanism and the steering angle sensor 21, the steering motor 22, and the steering angle servo controller 23 are arranged and configured to accommodate the front wheel steering mechanism. The steering angle sensor 21 is mounted to the front wheel steering mechanism and electrically connected to the steering angle servo controller, as will be discussed later. The steering angle servo controller 23 is electrically connected to the steering motor 22 and the microprocessor 20. The microprocessor 20 is electrically connected to the cameras 16, the wheel speed sensor 17, the yaw rate sensor 18, the acceleration sensor 19, and the brake controller 24.

The cameras 16 are arranged inside the cabin of the host vehicle 11 such that it can photograph a region in front of the host vehicle 11. The first embodiment is preferably provided with two cameras 16: a left one and a right one. An acquired information processing section 27 (described later, see FIG. 1) of the microprocessor 20 creates an image based on image signals from the cameras 16 and processes the information in the image in three dimensions. For example, the acquired information processing section 27 can detect the distance from the position where the host vehicle 11 exists to the obstacle 15 (see FIG. 2). The cameras 16 send the image signals to a vehicle information processing section 28 and an obstacle information processing section 29 (described later, see FIG. 1) of the acquired information processing section 27.

The wheel speed sensor 17 produces a signal for detecting the traveling speed of the host vehicle 11. In the first embodiment, the wheel speed sensor 17 is a rotary encoder mounted to a wheel of the host vehicle 11 and is configured to send a pulse signal proportional to the rotational speed of the wheel to the vehicle information processing section 28 (see FIG. 1).

The yaw rate sensor 18 is a sensor configured and arranged to send a signal for detecting the yaw rate of the host vehicle 11 to the vehicle information processing section 28 (see FIG. 1). The yaw rate sensor 18 uses a well-known technology employing a quartz transducer or semiconductor device.

The acceleration sensor 19 is a sensor configured and arranged to send a signal for detecting the acceleration rate of the host vehicle 11 in a specific direction to the vehicle information processing section 28 (see FIG. 1). The acceleration sensor 19 uses a well-known technology employing, for example, a piezoelectric device. The braking force acting on the host vehicle 11 can be estimated using the acceleration sensor 19.

The microprocessor 20 is an integrated circuit including an A/D converter circuit, a D/A converter circuit, a central processing unit, and a memory. The microprocessor 20 includes programs stored in the memory which constitute the acquired information processing section 27, a preceding object avoidance path setting section 30, a memory 31, and an obstacle arrival region estimating section 36 (see FIG. 1). The microprocessor 20 is contrived such that the acquired information processing section 27 processes the signals from the cameras 16 and the sensors 17 to 19 and generates various types of information. The preceding object avoidance path setting section 30 calculates avoidance actuation amounts for avoiding the obstacle 15 (see FIG. 1) based on the information from the acquired information processing section 27 and sends signals corresponding to the calculated avoidance actuation amounts to the steering angle servo controller 23 and the brake controller 24. Since the microprocessor 20 calculates the avoidance actuation amount based on the signals from the cameras 16 and the sensors 17 to 19, the cameras 16, the sensors 17 to 19, and the microprocessor 20 function as the avoidance actuation amount calculating unit 12. The memory 31 of the microprocessor 20 can store information such that information can be exchanged between the acquired information processing section 27 and the preceding object avoidance path setting section 30.

The steering angle servo controller 23 comprises a microprocessor for executing computerized control and voltage step-up circuit (not shown) for driving the steering motor 22. The steering angle servo controller 23 serves to execute servo control so as to achieve a targeted avoidance actuation amount corresponding to the signal received from the preceding object avoidance path setting section 30 of the microprocessor 20, i.e., the targeted steering angle (steering actuation amount).

The steering angle sensor 21 serves to send a signal for detecting the actual steering angle (steering actuation amount) to the steering angle servo controller 23. The steering angle servo controller 23 uses information based on this signal as feedback information for the servo control. In the first embodiment, the steering angle sensor 21 generates a signal corresponding to a rack stroke amount of the rack and pinion front wheel steering mechanism and sends the signal to the steering angle servo controller 23. The steering angle servo controller 23 can detect the steering angle (steering actuation amount) based on this signal.

The steering motor 22 is a motor that can operate the steering of the vehicle in accordance with a signal from the steering angle servo controller 23 independently of the driver's operation of the steering wheel. In the first embodiment, the steering motor 22 operates the steering by rotating the pinion gear of the rack and pinion front wheel steering mechanism.

In this way, the steering angle servo controller 23 can steer the vehicle by controlling the steering motor 22 and use the steering actuation amount detected by the steering angle sensor 21 to execute feedback control so as to execute a steering actuation amount included in the avoidance actuation amounts calculated by the preceding object avoidance path setting section 30 (see FIG. 1) of the microprocessor 20, i.e., a steering actuation amount among the avoidance actuation amounts calculated by the avoidance actuation amount calculating unit 12. Thus, the steering angle sensor 21, the steering motor 22, and the steering angle servo controller 23 function as a steering control section 32 of the vehicle motion control unit 13 serving to control the motion of the host vehicle 11.

A brake 26 is provided on each of the four wheels of the host vehicle 11 such that the rotation of each of the wheels can be controlled by braking. The brakes 26 are controlled with hydraulic pressure from the hydraulic pressure system 25, and the control valves (not shown) of the hydraulic pressure system 25 are connected electrically to the braking controller 24.

The brake controller 24 is a microprocessor serving to calculate a braking force to be exerted against each of the tires (i.e., tire grip force to be exerted by each of the tires). As will be described later, the brake controller 24 calculates the braking forces in order to exert a supplemental braking force calculated by the preceding object avoidance path setting section 30 of the microprocessor 20 against the host vehicle 11 or to exert the braking force required in order to achieve a deceleration amount for making the host vehicle 11 follow an avoidance path calculated by the preceding object avoidance path setting section 30. Since the brake controller 24 controls a braking torque in order to control the braking force exerted by each brake 26, the control target value for each wheel is issued from the microprocessor 20 to the braking controller as a braking torque $Ti^{com}$ expressed as shown in the equation (1) below. In the equation, the term "r" is the tire radius and Fi (where i=1, 2, 3, 4) is the braking force generated at the respective tire.

$$Ti^{com}=Fi/r \tag{1}$$

The brake controller 24 controls the opening degrees of the control valves (not shown) of the hydraulic pressure control system 25 in order to deliver the calculated braking torque. Consequently, the host vehicle 11 can be decelerated while providing a braking force difference between the left and right wheels, thereby exerting a yaw moment against the host vehicle 11.

More specifically, a deceleration amount included in the avoidance actuation amounts calculated by the preceding object avoidance path setting section 30 (see FIG. 1) of the microprocessor 20 is realized by causing the tires to exert braking forces and the braking forces are controlled by the brake controller 24, which controls the opening degrees of the control valves (not shown) of the hydraulic pressure control system 25. Thus, the brakes 26, the hydraulic control system 25, the brake controller 24, and the wheels function as a braking force control section 34 of the vehicle motion control unit 13.

As shown in FIG. 1, in the avoidance actuation amount calculating unit 12, the acquired information processing section 27 processes the signals from the cameras 16 and the sensors 17 to 19 and generates various types of information. The preceding object avoidance path setting section 30 calculates an avoidance actuation amount based on the generated information, and the obstacle arrival region estimating section 36 calculates an estimated arrival region A (see FIG. 5) of the obstacle 15 based on the obstacle information from the obstacle information processing section 29 of the acquired information processing section 27.

The acquired information processing section 27 includes the vehicle information processing section 28, the obstacle information processing section 29, and a road boundary information processing section 35. Based on the signals from the cameras 16 and the sensor 17 to 19, the vehicle information processing section 28 produces information regarding the host vehicle 11 in which the system is installed (see FIG. 1). Based on the signals from the cameras 16 and the sensor 17 to 19, the obstacle information processing section 29 produces information regarding the obstacle 15, and the road boundary information processing section produces information regarding a boundary portion 14a of the road 14. The road boundary information processing section 35 can also be configured to detect a guardrail provided on the road. With such a configuration, when an obstacle is detected on the road, it is possible to distinguish whether the obstacle is a pedestrian walking on the outside of the guardrail or a pedestrian who has entered the road.

Figure 2:
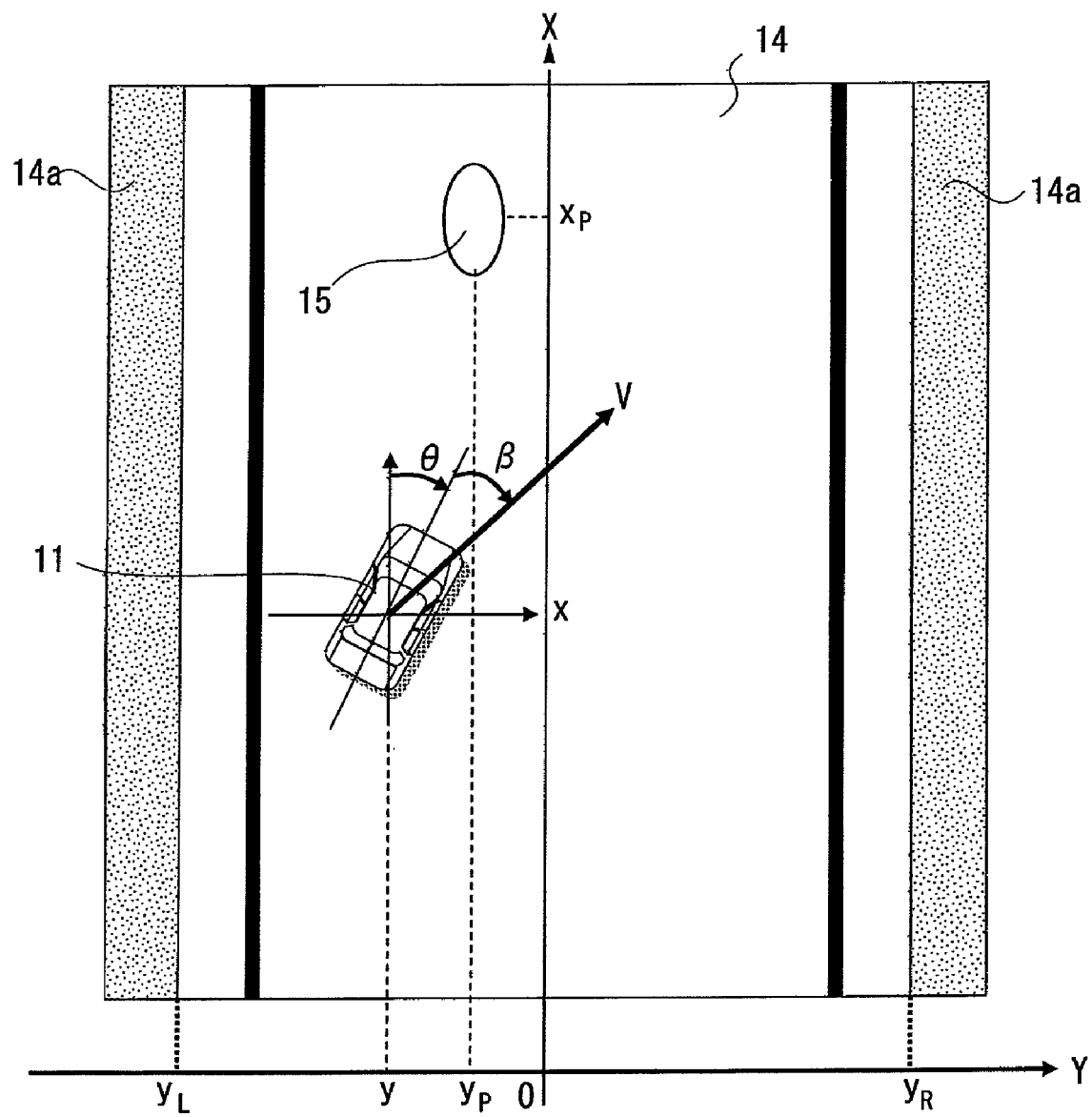
FIG. 2 is a schematic top plan view of the host vehicle traveling on a road with notations illustrating how the processed information is applied to the coordinate system.

The vehicle information produced by the vehicle information processing section 28 includes, as shown in FIG. 2, information regarding the position of the host vehicle 11 with respect to the road 14 on which it is traveling, information regarding the yaw angle $\theta$ of the host vehicle 11, information regarding the yaw rate $\gamma$ of the host vehicle 11, information regarding the slip angle $\beta$ of the host vehicle 11, and information regarding the traveling velocity v of the host vehicle 11. Here, the yaw angle $\theta$ is the angle between the direction of the road 14, i.e., the direction in which the road 14 extends at the portion where the host vehicle 11 exists, and the longitudinal centerline of the host vehicle 11, and the slip angle β is the angle between the longitudinal centerline of the host vehicle 11 and the actual direction in which the vehicle is moving.

The vehicle information processing section 28 can detect the position of the host vehicle 11 with respect to the road 14 by executing image processing with respect to the image signals from the pair of cameras 16.

The yaw angle θ can be found by assuming that the road is straight and estimating the angle between a boundary portion of the road 14 and the direction in which the host vehicle 11 is facing. It is also acceptable to establish an appropriate initial value and calculate the yaw angle by integrating the values outputted from the yaw rate sensor 18. For example, the direction in which the host vehicle 11 would be moving if it were traveling in the direction of the road 14, i.e., the direction in which the vehicle was traveling before a driving operation for avoiding the obstacle 15 was executed, can be set as the appropriate initial value.

The vehicle information processing section 28 can detect the yaw rate γ based on the signal outputted from the yaw rate sensor 18 as described previously.

The vehicle information processing section 28 can detect the travel velocity v based on the signal from the wheel speed sensor 17 by, for example, assuming the velocity component ($v_y$) in the lateral direction of the host vehicle 11 is sufficiently smaller than the velocity component ($v_x$) in the longitudinal direction of the host vehicle 11.

The slip angle β can be calculated using the equation (2) shown below, in which $v_x$ is the longitudinal velocity component of the host vehicle 11 and $v_y$ is the lateral velocity component of the host vehicle 11.

$$\beta = \arctan(v_y/v_x) \qquad (2)$$

If, for example, the lateral velocity component is sufficiently smaller than the longitudinal velocity component of the host vehicle 11, the velocity v can be used as $v_x$. The lateral velocity component $v_y$ can also be calculated by integrating the output of the acceleration sensor 19. Thus, an approximate value of the slip angle β can be obtained from the equation (2). There is also a known technology for estimating the slip angle more accurately depending on the observer based on the wheel speed signal from the wheel speed sensor 17, the yaw rate signal from the yaw rate sensor 18, and the lateral acceleration signal from the acceleration sensor 19, and it is acceptable to calculate the slip angle β using such a technology.

The obstacle information basically includes the size (dimensions) and the movement velocity of the obstacle 15 (see FIG. 2). The obstacle information processing section 29 can detect the obstacle information by executing image processing of the image signals from the pair of cameras 16.

As mentioned previously, the vehicle information processing section 28 functions as a vehicle information detecting section by operating in a coordinated manner with the cameras 16, the wheel speed sensor 17, the yaw rate sensor 18, and the acceleration sensor 19. Similarly, the obstacle information processing section 29 functions as a preceding object detecting section by operating in coordination with the cameras 16 and the road boundary information processing section 35 functions as a road boundary detecting section by operating in coordination with the cameras 16. Since there are numerous publicly known technologies for detecting an obstacle using image processing, the details of the detection method are omitted here.

The microprocessor 20 establishes a coordinate system such that the information detected by the host vehicle information detecting section, the preceding obstacle detecting section, and the road boundary detecting section, as well as the estimated travel path, can be used in a uniform manner. Thus, the information regarding the host vehicle 11 and the obstacle 15 is assigned to coordinate values such that the information corresponds to the same coordinate system (see FIG. 2). In the first embodiment, the coordinate system is set by the road boundary information processing section 35. As shown in FIG. 2, an X axis is set to extend along the direction of the road 14 and a Y axis is set to extend in the lateral direction (widthwise) direction of the road 14 so as to be perpendicular to the X axis. The origin of the coordinate system can be selected arbitrarily. The first embodiment illustrates an example in which the origin of the X axis is set at the current position of the vehicle and the origin of the Y axis is set at the centerline of the road 14 (see Figure X). Establishing the coordinate system enables the positions of the host vehicle 11 and the obstacle 15 to be expressed as coordinate values. In the explanations that follow, as shown in FIG. 2, the X and Y coordinates for the position of the host vehicle 11 correspond to the center of gravity of the host vehicle 11 and are indicated as "(x, y)," the X and Y coordinates for the position of the obstacle 15 (a moving pedestrian in the first embodiment) are indicated as "($x_p$, $y_p$)," and the Y coordinates of the left and right boundary sections 14a of the road 14 are indicated as "$y_L$" for the left side and "$y_R$" for the right side. Additionally, the velocity of the obstacle 15 is indicated as "$v_p$" (see Figure X); the velocity in the direction along which the road 14 extends is indicated as "$v_{px}$" and the velocity in the widthwise direction of the road 14 is indicated "$v_{py}$."

The obstacle arrival region estimating section 36 calculates the attribute of the obstacle 15 and the estimated arrival region A (see FIG. 5) of the obstacle 15 based on the obstacle information from the obstacle information processing section 29.

The attribute of the obstacle 15 is an indicator based on such characteristics as the size and shape of the obstacle 15 and serves to indicate, for example, whether the obstacle 15 is a person, a bicycle, or the like. If the obstacle 15 is a person, the attribute can also indicate whether the person is an adult or a child. The attribute is used to estimate a predicted movement state of the obstacle 15 based on the detected obstacle information, and the predicted movement state and the attribute are used to calculate the estimated arrival region A, i.e., the largest region within which the obstacle 15 could possibly arrive after a prescribed amount of time has elapsed.

More specifically, even if the movement velocity is known (detected), the movement state of the obstacle 15 will differ depending on whether the obstacle 15 is a person or a bicycle (e.g., a person could be stationary, walking, running, or the like). Thus, even if the movement velocity of the obstacle 15 is detected, it is difficult to estimate (predict) what the movement state of the obstacle 15 will be without knowing the attribute of the obstacle 15. Similarly, even if it is known (detected) that the obstacle 15 is a person walking, the size of the largest region into which the person can possibly arrive after a prescribed amount of time has elapsed will differ depending on whether the person is an adult or a child.

The attribute of the obstacle 15 (e.g., an indication of whether the obstacle is a person, or, if a person, whether the person is an adult of a child) can be estimated based on the width dimension (Y direction), the depth dimension (X direction), and the height dimension (direction perpendicular to the plane containing the X and Y axes) obtained from the obstacle information, which is based on the images captured by the cameras 16. Since there are publicly known technologies for estimating the size of a detected object using image processing, a description of a specific method is omitted here for the sake of brevity.

The estimated arrival region is set in the X-Y plane. The method by which the obstacle arrival region estimating section calculates the estimated arrival region A in the first embodiment will now be explained. In the following explanation, in addition to assuming the characteristics of the first embodiment, it is also assumed that the detected obstacle 15 is a person who has suddenly moved onto the road 14 substantially along the Y axis direction (the crosswise direction of the road 14).

In general, the range of variation of the movement state of a person, e.g., the range of variation of the movement speed of a person, depends not only on the attribute of the person (adult or child) but also on the intent of the person. However, the intent of a person is difficult to know in an accurate manner. Therefore, in the first embodiment, the predicted movement state of the detected obstacle 15 is estimated by categorizing the movement state roughly based on the movement velocity of the person or object.

Figure 3:
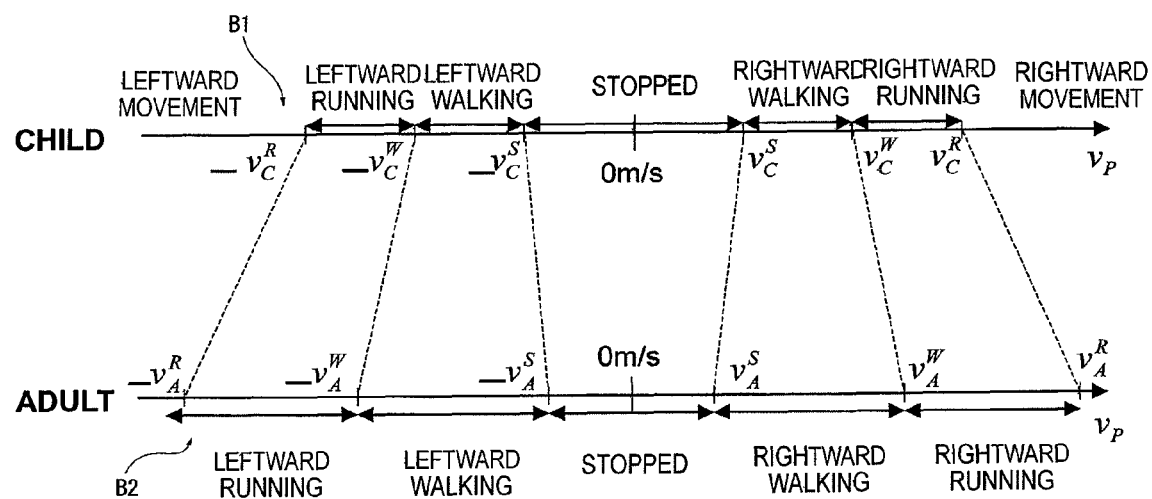
FIG. 3 is a graph illustrating velocity range bands comprising a plurality of velocity ranges used for estimating the movement state of an obstacle.

In the first embodiment, as shown in FIG. 3, two velocity range bands B1 and B2 are established in advance for use when the obstacle 15 is determined to be a person. Each of the velocity range bands B1 and B2 divided in to five sections for a total of ten predicted movement states, each corresponding to a specific range of velocities. The velocity range band B1 is for when the attribute indicates the obstacle 15 is a child and the velocity range band B2 is for when the attribute indicates the obstacle 15 is an adult. The five sections serve to categorize the movement state of the person into a stopped state, a walking state, or a running state. Also in the case of walking or running, the five sections serve to indicate whether the person is moving leftward or rightward so as to indicate whether the direction in which the person was moving at the time of detection was from the right side or from the left side of the road 14. The reason the attribute is contrived to indicate the direction is because when an obstacle that did not previously exist on the road is detected, it is possible that the obstacle entered the road from the right side or left side of the road.

For each of the preset five predicted movement states, the system sets a velocity range corresponding to either a stopped condition, a walking condition, or a running condition. In this embodiment, the velocity of the detected obstacle 15 is indicated as positive (+) when the obstacle 15 is moving rightward relative to the direction in which the host vehicle 11 is traveling and negative (−) when the obstacle 15 is moving leftward relative to the direction in which the host vehicle 11 is traveling. The velocity ranges are set to encompass appropriate speeds for a person moving in a manner that would generally be considered walking or running. For example, in the case of the velocity range band B1 for children, the velocity ranges for a walking child are set in terms of a smallest velocity ($v^S_C$) and a largest velocity ($v^W_C$) that can reasonably be considered to be a walking state for a child. Similarly, the velocity ranges for a running child are defined in terms of smallest and largest velocities ($v^W_C$ and $v^R_C$) that can reasonably be considered to be a running state for a child. The velocity range corresponding to the stopped state is the range enclosed by the minimum speeds ($-v^S_C$ and $v^S_C$) of the leftward and rightward walking state velocity ranges.

Based on the detected obstacle information, the obstacle arrival range estimating means 36 selects the velocity range band B1 or B2 that matches the attribute of the obstacle 15 and then selects the velocity range of the selected velocity range band that corresponds to the movement velocity $v_p$ of the obstacle 15. In this way, the obstacle arrival region estimating section 36 estimates the movement state of the obstacle 15. In the first embodiment, for example, if the obstacle 15 is detected to be a child moving rightward at a movement speed $v_p$ that satisfies the relationship $v^S_C < v_p < v^W_C$, then the obstacle arrival region estimating section 36 estimates that the child is walking rightward because the rightward movement velocity $v_p$ corresponds to the rightward walking velocity range of the velocity range band B1. Thus, the movement velocity range of the obstacle 15 is set using the equation (3) shown below.

$$v^S_C \leq v_p \leq v^W_C \qquad (3)$$

Meanwhile, for example, if the obstacle 15 is detected to be an adult who is moving rightward but the movement speed $v_p$ cannot be detected appropriately, i.e., if the detection results indicate that the obstacle 15 could possibly move rightward but it is unclear whether the obstacle 15 is walking or running (such a detection result could occur if, for example, the obstacle 15 has just been detected for the first time at the left-hand edge of the road 14), then the movement velocity range of the obstacle 15 is set using the equation (4) in order to include all of the possible movement states, i.e., the stopped state, the rightward walking state, and the rightward running state.

$$-v^S_A \leq v_p \leq v^R_A \qquad (4)$$

If an obstacle 15 is detected but neither the attribute nor the movement speed can be determined, the movement velocity range of the obstacle 15 is set using the equation (5) to include all of the possibilities.

$$-v^R_A \leq v_p \leq v^R_A \qquad (5)$$

It is also acceptable to configure the obstacle arrival region estimating section 36 to select the two adjacent velocity ranges whenever the movement speed of the detected obstacle 15 is in the vicinity of the boundary between two of the preset velocity ranges.

Figure 5:
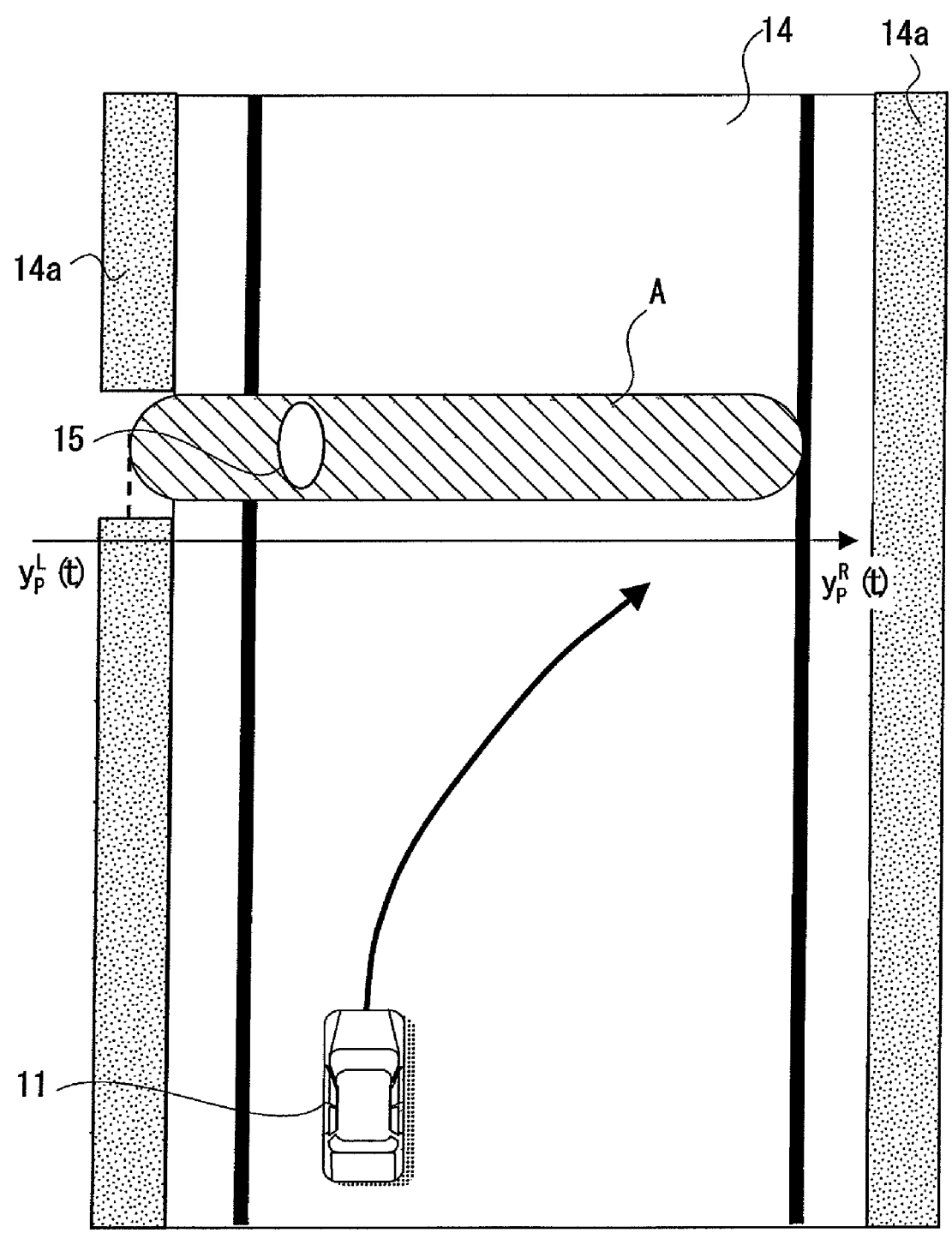
FIG. 5 is a schematic top plan view of the host vehicle traveling on a road with notations for explaining the estimated arrival region.

After selecting the velocity range, the obstacle arrival region estimating section 36 calculates the estimated arrival region A based on the selected velocity range as shown in FIG. 5. In the first embodiment, since it is assumed that the obstacle 15 is moving along the direction of the Y axis, the X dimension of the estimated arrival region A (i.e., the dimension along the direction in which the road 14 extends) is fixed at the width dimension $\sigma_X$ of the obstacle 15 in the X direction. Conversely, the Y dimension of the estimated arrival region A (i.e., the dimension along the widthwise direction the road 14) is an expansion of the Y dimension $\sigma_Y$ of the obstacle 15 along the Y direction in accordance with the selected velocity range.

Using the variable "t" to represent the time and assuming the current time (time at which the detection occurred) is $t_0$ ($t=t_0$), consider a case in which the velocity of the detected obstacle 15 is $v_p$, the position coordinates of the obstacle 15 at the current time $t_0$ are $(x_{P0}, y_{P0})(=(x_P(t_0), y_P(t_0)))$, and the selected velocity range is $(v_p^{Min} \leq v_p \leq v_p^{Max})$. The X dimension of the estimated arrival region A is fixed at the X dimension $\sigma_X$ of the obstacle 15 and, relative to the X direction, the estimated arrival region A remains centered at the position $x_P(t_0)$ regardless of the time t. The Y dimension of the estimated arrival region A can be calculated in terms of left and right Y coordinates using the equations (6) and (7) below, where $y_P^L(t)$ is the Y coordinate of the leftmost side and $y_P^R(t)$ is the Y coordinate of the rightmost side of the region A at a particular time t.

$$y_P^L(t) = y_P(t_0) + v_p^{Min} \times t \qquad (6)$$

$$y_P^R(t) = y_P(t_0) + v_p^{Max} \times t \qquad (7)$$

Figure 6:
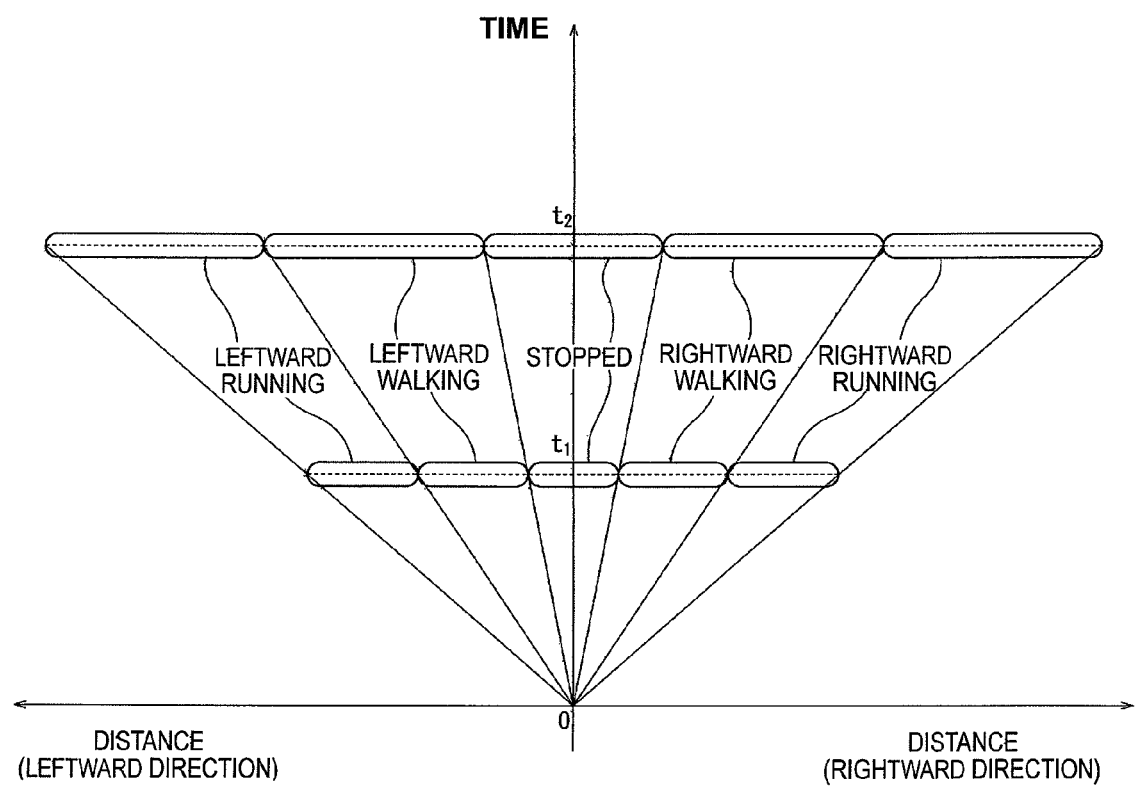
FIG. 6 is a graph illustrating how the estimated arrival region changes with the passage of time.

FIG. 6 shows the estimated arrival region A expressed by the equations (6) and (7). In FIG. 6, the vertical axis indicates the elapsed since the time $t_0$ when the obstacle was detected and the horizontal axis indicates the position of the obstacle 15 in terms of the distance from the position at the time $t_0$. Thus, the origin of the vertical axis corresponds to the time $t_0$ and the origin of the horizontal axis corresponds to the position of the obstacle 15 at the time $t_0$.

As explained previously, the acquired information processing section 27 of the microprocessor 20 generates required information based on the signals from the cameras 16 and the sensors 17 to 19 and the preceding object avoidance path setting section 30 calculates an avoidance path based on the information.

The preceding object avoidance path setting section 30 has an avoidance path calculating section 37, an avoidability determining section 38, and a buffer memory 39.

The avoidance path calculating section 37 is configured to calculate a path in which the host vehicle 11 can avoid the estimated arrival region A of the obstacle 15 in a manner that takes into account that the area of the estimated arrival region A will change over time as the obstacle 15 moves. In the first embodiment, the avoidance path calculating section 37 sets a time period to be encompassed by the avoidance path calculation before calculating the avoidance path.

The avoidance path is preferably calculated such that the host vehicle 11 avoids the obstacle 15 and, afterwards, continues to travel on the road in an appropriate state. Therefore, the avoidance path calculating section 37 is configured to estimate the time required to avoid the obstacle 15, set an end time occurring when a prescribed amount of time has elapsed after the obstacle 15 has been avoided, and calculate an avoidance path that encompasses the time up to the end time. In the first embodiment, it is assumed that the detected obstacle 15 is moving along the Y axis direction at a movement velocity $v_p$ (see FIG. 2). Therefore, the time at which the host vehicle 11 reaches the position of the obstacle 15, i.e., the time at which the host vehicle 11 avoids the obstacle 15 (hereinafter called "avoidance time"), is the point in time when the X coordinate of the position of the host vehicle 11 is equal to the X coordinate of the position of the obstacle 15 (i.e., when $x = x_p$). Therefore, the avoidance time $T_p$, i.e., the amount of time that will elapse from the time t0 when the obstacle 15 was detected (hereinafter called "detection time") until the time when the host vehicle 11 reaches the X coordinate of the obstacle 15, can be calculated using the equation (8) below. In the equation, the coordinates $x_0$ and $y_0$ indicate of the position of the host vehicle 11 at the detection time $t_0$, the term $v_{C0}$ indicates the velocity (speed) of the host vehicle 11 at the detection time $t_0$, and d indicates the deceleration rate of the host vehicle 11 at the detection time $t_0$ if a braking force is acting on the host vehicle 11 (e.g., if the driver has recognized the obstacle 15 and is depressing the brake pedal).

$$T_P = \begin{cases} \dfrac{x_P - x_O}{V} & \cdots \text{When not braking} \\ \dfrac{VC_O - \sqrt{VC_O^2 - 2d \cdot (x_P - x_O)}}{d} & \cdots \text{When not braking} \end{cases} \qquad (8)$$

In the situation illustrated in FIG. 2, it is necessary to calculate the avoidance path in a manner that incorporates avoidance of the boundary portions 14a (see $y_L$ and $y_R$) of the road 14 (prevention of road departure) in addition to avoidance of the obstacle 15. Therefore, the avoidance path needs to extend beyond the point where the host vehicle 11 reaches the position of the obstacle 15 and include a path to be followed after the obstacle 15 is avoided. For this reason, in the first embodiment, the avoidance path is calculated to extend to a point where a prescribed amount of time $T_{after}$ has elapsed since the obstacle 15 was avoided. Thus, the time period T encompassed by the avoidance path calculation is set using the equation (9) shown below.

$$T = T_p + T_{after} \qquad (9)$$

The travel path followed by a vehicle is determined based on the manner in which actuation amounts (e.g., brake and steering actuation amounts) are imposed on the vehicle over time. Therefore, in order to calculate the avoidance path, the avoidance path calculating section 37 employs vehicle motion model equations that express the dynamics of the vehicle and the relationships between actuation amounts and the travel path of the vehicle. For example, the vehicle motion model equations used in the first embodiment are as shown below (U. Kiencke and L. Nielsen, "Automotive Control Systems," Springer Verlag, (2000)). In the equations, x' indicates the time derivative of x.

$$x' = f(x, u) \qquad (10)$$

$$x = (v \beta \gamma)^T \qquad (11)$$

$$u = (F1 F2 F3 F4 \delta)^T \qquad (12)$$

In the equations, the term $\delta$ is the front wheel steering angle, Fi (i=1, 2, 3, 4) is the braking force acting on each of the wheels, the term f is a non-linear function describing the behavior of the vehicle, and the term u is an input vector. The superscript T indicates the transpose of the row or vector.

If the initial value of the output vector corresponding to the detection time $t_0$, i.e., $x(t_0) = (v_0 \beta_0 \gamma_0)$, can be ascertained, then a time series of the output vector x corresponding to any input vector u can be estimated by integrating the equation 10.

The initial value $v_{C0}$ of the velocity of the host vehicle 11 (i.e., the vehicle speed at the detection time $t_0$) can be determined based on the detection signal from the wheel speed sensor 17 or the acceleration sensor 19. When the host vehicle 11 can be assumed to be traveling in a straight line, the initial value $\beta_0$ of the slip angle of the host vehicle 11 can be set to 0 ($\beta_0 = 0$) and the initial value $\gamma_0$ of the yaw rate of the host vehicle 11 can be set to 0 ($\gamma_0 = 0$). If the host vehicle 11 is not traveling in a straight line, the slip angle $\beta$ is estimated using the yaw rate $\gamma$ measured by the yaw rate sensor 18, the vehicle speed v measured by the wheel speed sensor 17, and the acceleration measured by the acceleration sensor 19.

Of the components of the input vector u, the braking forces Fi (i=1, 2, 3, 4) acting on the wheels are set to appropriate constant values corresponding to the braking force acting on the host vehicle 11 at the detection time $t_0$. Thus, if the driver is not depressing the brake pedal, the braking forces Fi are set to 0 and, if the driver is depressing the brake pedal, the braking forces Fi are set to appropriate constant values in accordance with the deceleration rate d (see the equation (8)) of the host vehicle 11. Consequently, in the first embodiment, the avoidance path is calculated based on the assumption that the braking force acting on the host vehicle 11 at the detection time $t_0$ continue to act on the host vehicle 11 without changing and the calculated avoidance path is characterized by the front wheel steering angle δ component of the input vector u.

The time series of the state vector x calculated based on a given time series of the actuation amount vector u in accordance with the vehicle model described above can be used to calculate the travel path by applying the coordinate conversion equations (13 to 15) to the time series of the state vector x.

$$x' = v \times \cos(\beta+\theta) \quad (13)$$

$$y' = v \times \sin(\beta+\theta) \quad (14)$$

$$\theta' = \gamma \quad (15)$$

In order to calculate the avoidance path based on this travel path, the evaluation equation (16) shown below is solved based on the assumption of a time series of the input vector u corresponding to the time period T spanning from the current time $t_0$ when the obstacle 15 is detected to the time when the prescribed amount of time $T_{after}$ will have elapsed. The smaller the value obtained with the equation (16), the better the evaluation result.

$$J[u(t)] = \int^T L(x(t), u(t), t) dt \quad (16)$$

The function L that is integrated in the equation (16) is a function expressing the appropriateness of the travel path as an avoidance path in a numerical manner. In the first embodiment, there are three evaluation standards used to determine the appropriateness of a travel path as an avoidance path.

Standard 1: The front wheel steering angle δ is not larger than necessary.

Standard 2: The host vehicle 11 does not get too close to a boundary portion 14a of the road 14.

Standard 3: The host vehicle 11 does not get too close to the obstacle 15.

The objective of Standard 1 is to avoid the obstacle 15 with the smallest steering angle possible and can be evaluated using, for example, the equation (17).

$$L_\delta(\delta(t)) = (\delta(t))^2/2 \quad (17)$$

Requirement 2 relates to the degree of convergence of the host vehicle 11 with respect to the boundary portions 14a of the road 14 and is expressed with a function that increases in value as the distance between the host vehicle 11 and the boundary 14a decreases. More specifically, for example, the function expressed by the equation (18) can be used.

$$L_R(x(t), y(t)) = \begin{cases} \frac{1}{2}(y(t) - y_L - \Delta)^2 & \cdots \quad y(t) \leq y_L + \Delta \\ 0 & \cdots \quad y_L + \Delta < y(t) < y_R - \Delta \\ \frac{1}{2}(y(t) - y_R - \Delta)^2 & \cdots \quad y(t) \geq y_R - \Delta \end{cases} \quad (18)$$

In this equation, the term Δ is a parameter designating the separation to be maintained between vehicle 11 and the boundary portion 14a. The larger the value of Δ is, the larger the separation is between the avoidance path of the host vehicle 11 and the boundary portion 14a.

Requirement 3 relates to the degree to which the host vehicle 11 draws near to the obstacle 15 and is expressed with a function that increases in value as the distance between the host vehicle 11 and the obstacle 15 decreases. More specifically, for example, the function expressed by the equations (19) and (20) can be used.

$$L_P(x(t), y(t), t) = \quad (19)$$
$$\exp\left(-\frac{(x(t) - x_P(t))^2}{\sigma_x^2}\right) \cdot \left(\exp(\phi y(t), t) + \exp\left(-\frac{(y(t) - y_P(t))^2}{\sigma_y^2}\right)\right)$$

$$\phi(y(t), t) = \begin{cases} -(y(t) - y_P^L(t))^2 & \cdots \quad y(t) < y_P^L(t) \\ 0 & \cdots \quad y_P^L(t) \leq y(t) \leq y_P^R(t) \\ -(y(t) - y_P^R(t))^2 & \cdots \quad y(t) > y_P^R(t) \end{cases} \quad (20)$$

In the equations, terms $\sigma_X$ and $\sigma_Y$ are parameters that determine the shape of the function. In this embodiment, the values of $\sigma_X$ and $\sigma_Y$ are set based on the X dimension and the Y dimension, respectively, of the obstacle 15. If information regarding the X dimension (depth dimension) of the obstacle 15 cannot be obtained, then the parameter $\sigma_X$ can be set to the same value as $\sigma_Y$ ($\sigma_X = \sigma_Y$).

The items $x_P(t)$ and $y_P(t)$ express the coordinates of the point having the highest probability to be the position of the obstacle 15 at a given time t. One example of a simple method of estimating $x_P(t)$ and $y_P(t)$ is to assume the obstacle 15 will continue to move linearly at a constant speed and use the equations (21) and (22) shown below. In the equations, $x_{P0}$ and $y_{P0}$ indicate the position coordinates of the obstacle 15 at the detection time $t_0$ (($x_{P0}, y_{P0}$) = ($x_P(t_0), y_P(t_0)$)) and vp indicates the movement velocity of the obstacle 15.

$$x_P(t) = x_{P0} \quad (21)$$

$$y_P(t) = y_{P0} + v_P \times t \quad (22)$$

The evaluation function L expressed in the equation (23) below is obtained by weighting each of the three evaluation functions defined as described above (i.e., the evaluation equations for each of the three requirements) appropriately and adding them together in a linear fashion.

$$L = w_\delta L_\delta + w_R L_R + w_P L_P \quad (23)$$

Figure 4:
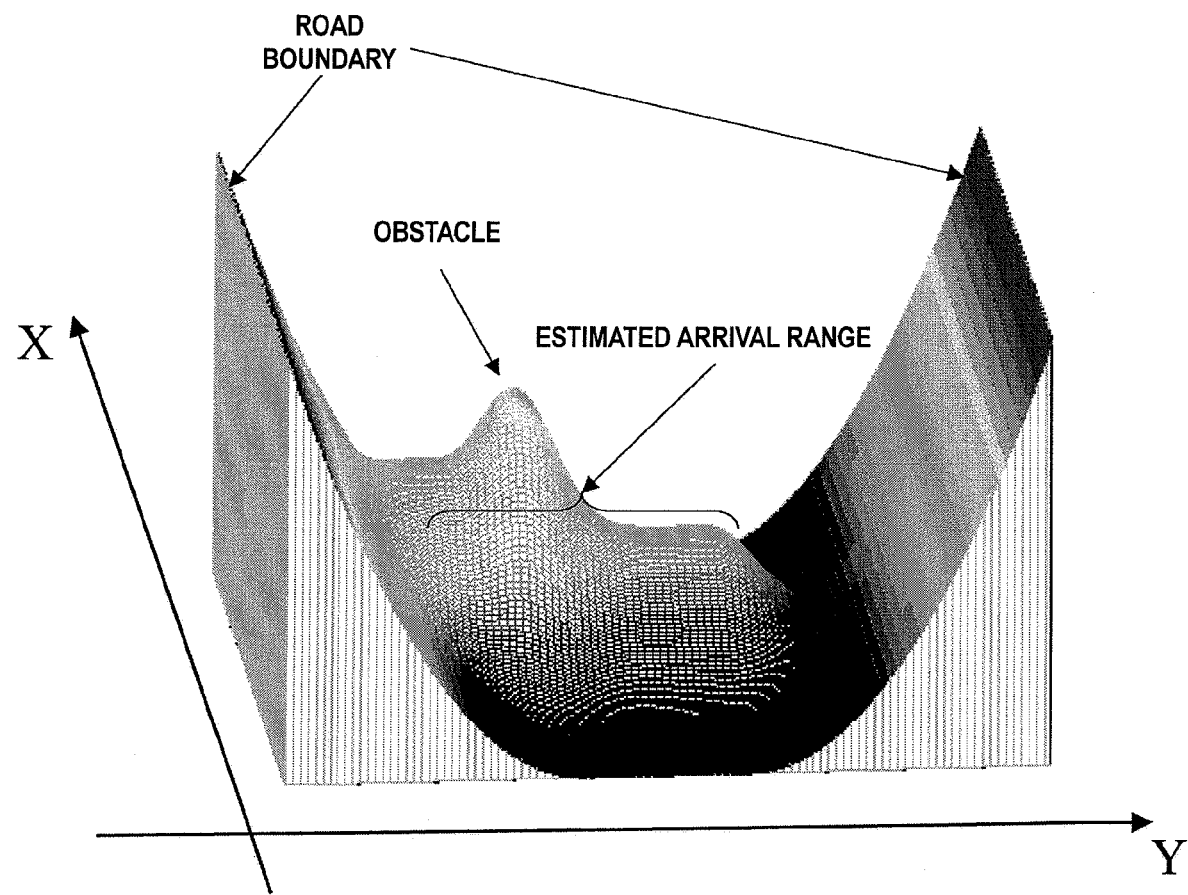
FIG. 4 is a graph showing an example of a function shape at a particular point in time of an evaluation expression used to evaluate a calculated avoidance path in a situation assumed in the first embodiment, with the expression related to the convergence degree (risk) with respect to the obstacle and the road boundaries.

FIG. 4 shows a concrete example of the function shape of the $w_R L_R + w_P L_P$ portion of the equation (23), which expresses the degree of convergence, i.e., the risk potential, of the host vehicle 11 with respect to an object existing on the road 14. The function shape is shown on the X-Y plane together with the road 14.

By defining the evaluation function as just shown, the problem of finding the avoidance path can be reduced to an optimal control problem using predetermined formulaic equations. More specifically, the avoidance path can be found by finding the input vector u (i.e., the front wheel steering angle δ in the first embodiment) that produces the best evaluation value when put into the evaluation function expressed by the equation (16), which is constructed based on the equations (9) and (13) to (15). Using the input vector u, the optimal avoidance path can be found by integrating the equations (9), (13), (14), and (15). Since there are several publicly known technologies for methods of solving optimal control problems, a detailed explanation of the method is omitted here for the sake of brevity. FIG. 5 shows an example of the calculation results for the estimated arrival region A of the obstacle 15 and the optimal avoidance path at a particular point in time. The time series of the calculated input vector u, i.e., of the front wheel steering angle δ, is stored in the buffer memory 39 in the form of a signal sampled at an appropriate sampling cycle time.

The buffer memory 39 can store the time series values of the input vector u, i.e., front wheel steering angle δ, calculated by the avoidance path calculating section 37 in the order in which they will be read. The avoidance path stored in the buffer memory 39 can be evaluated by the avoidability determining section 38 to determine if it is appropriate or not.

More specifically, the avoidability determining section 38 determines if the host vehicle 11 would encroach on the estimated arrival region A of the obstacle 15 during the time period T (i.e., during the period from the current time $t_0$ until the end of the prescribed amount of time $T_{after}$) if it actually followed the avoidance path that results from the input vector u, i.e., the front wheel steering angle δ, calculated by the avoidance path calculating section 37.

The avoidability determining section 38 calculates a time series of the position of the host vehicle 11 as it travels along the avoidance path based on the calculated time series of the front wheel steering angle δ and the equations (10) to (15). The avoidability determining section 38 also calculates the position coordinates of the estimated arrival region A of the obstacle 15 at each point in time using the equations (6) and (7). Then, for each point in time from the current time $t_0$ the point in time marking the end of the prescribed amount of time $T_{after}$, the avoidability determining section 38 determines if the position of the host vehicle 11 overlaps with the estimated arrival region A.

If the determination result indicates that the host vehicle 11 will not encroach on the estimated arrival region A at any point in time during the entire time period T, then the avoidance path calculated by the avoidance path calculating section 37 is adopted as an avoidance path. That is, avoidance control is executed so as to achieve the front wheel steering angles δ described by the time series stored in the buffer memory 39.

As will be described later, the obstacle avoidance control system 10 is configured such that there are situations in which a maximum braking force is exerted against the host vehicle 11. The method of setting the braking force(s) will now be explained.

The maximum braking force value $Fi^{Max}$ (i=1, 2, 3, 4) that can be exerted by each tire can be calculated using the equation (24) shown below, where Wi (i=1, 2, 3, 4) is the weight load born by the respective wheel.

$$Fi^{Max} = \mu Wi \quad (24)$$

In this embodiment, the road surface friction coefficient μ is set in advance to a value that can be assumed to be typical for the kind of road on which the host vehicle 11 will travel. It is also possible to use any of numerous publicly known technologies to estimate the road surface friction coefficient μ. The wheel loads Wi can be estimated accurately by using wheel load values obtained when the host vehicle 11 is at rest as reference values and revising the reference values using the measurement value obtained from the acceleration sensor 19.

Since the brake controller 24 controls a braking torque in order to control the braking force exerted by each brake 26, the control target value for each wheel is issued from the microprocessor 20 to the brake controller 24 as a braking torque $Ti^{com}$ expressed as shown in the equation (25) below, where r is the tire radius.

$$Ti^{com} = Fi^{Max}/r \quad (25)$$

The steps executed by the obstacle avoidance control system 10 in order to avoid an obstacle 15 will now be explained with reference to the flowchart shown in FIG. 7. The flowchart is based on the assumption of a situation like that shown in FIG. 5. FIG. 5 depicts a situation in which the host vehicle 11 in which the obstacle avoidance control system 10 is installed is traveling along the road 14 and a pedestrian (obstacle 15) has suddenly entered the road 14 from the left side in front of the host vehicle 11. The steps of the flowchart are repeated continuously while the host vehicle 11 is traveling.

Obstacle Avoidability Processing

The processing of step S101 is executed by the acquired information processing section 27 (e.g., the vehicle information processing section 28, the obstacle information processing section 29, and the road boundary information processing section 35). The acquired information processing section 27 produces required information based on the output signals from the cameras 16 and the sensors 17 to 19 and stores the information in the memory 31. The information is converted as appropriate to correspond to a set coordinate system. Step S101 is executed repeatedly while the host vehicle 11 is traveling (moving) and the information produced is stored in cumulative fashion. The information in the memory 31 can be read by the acquired information processing section 27 and the preceding object avoidance path setting section 30.

In step S102, the microprocessor 20 determines if an obstacle 15 exists on the road 14 based on the information from the acquired information processing section 27. If an obstacle 15 exists, the microprocessor 20 proceeds to step S103. If an obstacle 15 does not exist, then the microprocessor 20 proceeds to step S111. It is also acceptable to configure the system such that when it is determined that the host vehicle 11 is very unlikely to reach the position of the detected object (e.g., when the detected object is a pedestrian walking on the outside of a guardrail), the detected object is not determined to be an obstacle 15 and the microprocessor 20 proceeds to step S111.

In step S103, since an obstacle 15 has been detected, the obstacle arrival region estimating section 36 sets the velocity range for calculating the estimated arrival region A of the obstacle 15. The processing steps executed in step S103 will now be explained with reference to the flowchart (Processing A) shown in FIG. 8.

Obstacle Estimated Arrival Region Calculation

In step S1031, the microprocessor 20 determines if the obstacle 15 detected in step S102 is a newly detected object or an object that was detected in a previous control cycle. If the obstacle 15 is new, then the microprocessor 20 proceeds to step S1032. If the obstacle 15 is a previously detected obstacle, then the microprocessor 20 proceeds to step S1035.

In step S1032, the microprocessor 20 estimates the attribute of the newly detected obstacle 15. More specifically, in the first embodiment, the microprocessor 20 determines whether the obstacle 15 is a person or a bicycle and, if the obstacle 15 is a person, whether the person is an adult or a child.

In step S1033, the microprocessor 20 determines which section(s) of the velocity range bands B1 and B2 corresponds to the velocity $v_p$ of the obstacle 15 as an initial estimation of the movement state of the obstacle 15. More specifically, in the first embodiment, the microprocessor 20 determines if the obstacle 15 is stationary, walking to the left or right, or running to the left or right. Also, in the first embodiment, since the information regarding the obstacle 15 is acquired using image processing, there is the possibility that the movement velocity $v_p$ and the size dimensions of the obstacle 15 can not be accurately ascertained when the obstacle 15 is first detected. Therefore, in this step, the microprocessor 20 determines that the movement state includes all possibilities. If obstacle information that is reasonably appropriate can be obtained, it is possible to estimate the movement state based on the velocity range that matches the obstacle information.

In step S1034, the microprocessor 20 sets the velocity range that corresponds to the estimated movement state of the obstacle 15. In the first embodiment, if the obstacle 15 is determined to be a person, the microprocessor 20 sets the velocity range to the largest possible velocity range in order to include all of the velocities that could possibly occur when the obstacle 15 is a person (i.e., the microprocessor 20 sets the velocity range to the entire adult velocity range band B2($-v^R_A \leq v_p \leq v^R_A$)).

In step S1035, which is executed when the obstacle 15 has been determined to be previously detected in step S1031, the microprocessor 20 discards the movement velocity ($v_p$) information detected previously and detects the new movement velocity $v_p$ of the obstacle 15.

In step S1036, the microprocessor 20 determines which velocity range of the set velocity range band corresponds to the newly detected movement velocity $v_p$ of the obstacle 15 and thereby estimates the movement state of the obstacle 15 (in the first embodiment, the movement state refers to whether the obstacle 15 is stationary, walking to the left or right, or running to the left or right).

In step S1037, the microprocessor 20 sets the velocity range that corresponds to the movement state of the obstacle 15, which has been estimated based on the newly detected movement velocity $v_p$.

Figure 8:
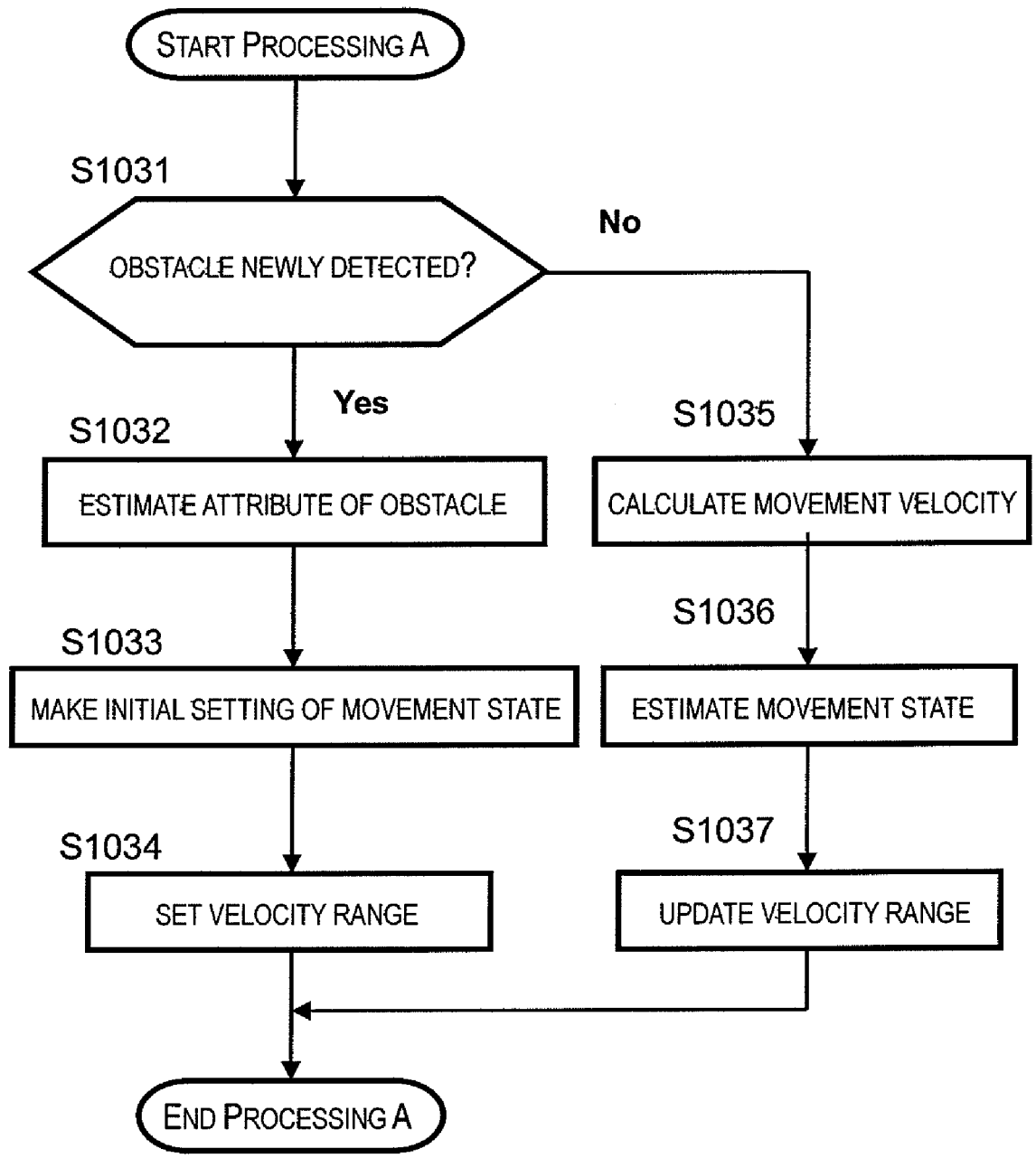
FIG. 8 is a flowchart showing the control processing executed by a Processing A (i.e., the details of step S103 of FIG. 7)

After the velocity range is set in either step S1034 or S1037, the processing of the flowchart shown in FIG. 8 ends and the microprocessor 20 proceeds to step S104.

In step S104, the preceding object avoidance path setting section 30 calculates an avoidance path based on the set velocity range. The processing steps executed in step S104 will now be explained with reference to the flowchart (Processing B) shown in FIG. 9.

Avoidance Path Calculation

In step S1041, the microprocessor 20 detects the braking force acting on the host vehicle 11 based on the vehicle information from the vehicle information processing section 28 and sets a time period T (see equations (8) and (9)) for calculating an appropriate avoidance path based on the detected braking force.

In step S1042, the microprocessor 20 sets an evaluation function for evaluating the avoidance paths that can be accomplished by the host vehicle 11 during the set time period T.

In step S1043, the microprocessor 20 calculates the optimal avoidance path that is evaluated to be the most appropriate by the evaluation functions and calculates the input vectors u, i.e., the front wheel steering angles δ, required over time to accomplish the calculated avoidance path.

In step S1044, the calculated front wheel steering angles δ (which constitute a time series) are stored in the buffer memory 39 so as to be arranged in the order in which they will be read out of the buffer memory 39. If steering angle control for avoiding a collision has already been started, then there will be command values already stored in the buffer memory 39 and these existing command values will be overwritten with new command values for the newly calculated avoidance path.

Figure 9:
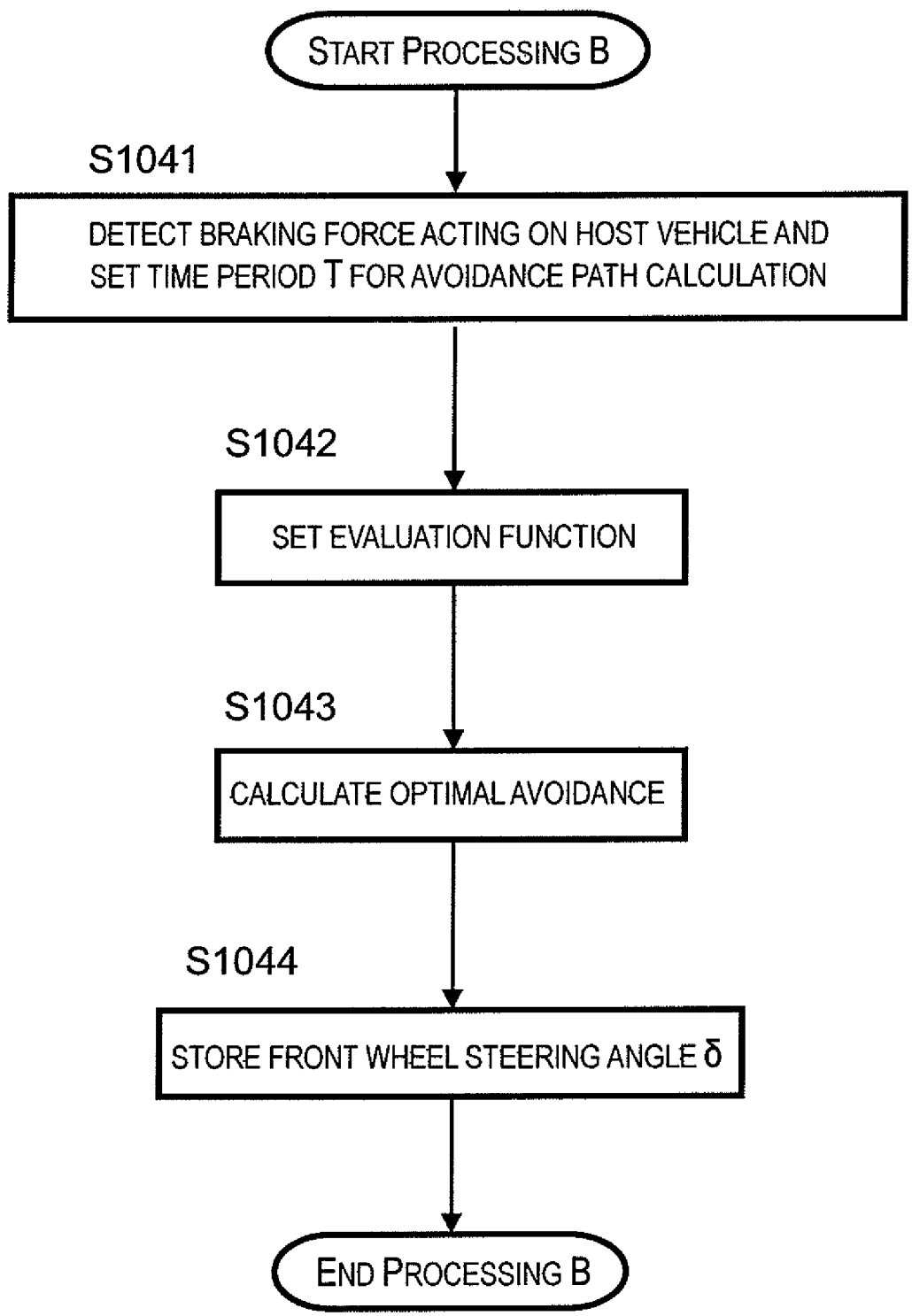
FIG. 9 is a flowchart showing the control processing executed by a Processing B (i.e., the details of step S104 of FIG. 7)

After the calculated time series of front wheel steering angles δ is stored in the buffer memory 39 in step S1044, the processing of the flowchart shown in FIG. 9 ends and the microprocessor 20 proceeds to step S105.

In step S105, the avoidability determining section 38 determines whether or not the host vehicle 11 will encroach on the estimated arrival region A of the obstacle 15 if it actually follows the calculated avoidance path. Then, the microprocessor 20 proceeds to step S106. In step S106, if the avoidability determining section 38 determines that the host vehicle 11 will encroach, then the microprocessor 20 proceeds to step S107 instead of executing the avoidance path because there is the possibility that the host vehicle 11 will reach the position of the obstacle 15 even if the avoidance path is executed. If the avoidability determining section 38 determines that the host vehicle 11 will not encroach if the avoidance path is executed, then the microprocessor 20 proceeds to step S109 and executes the avoidance path because the host vehicle 11 can avoid the obstacle 15 by following the avoidance path.

In step S107, since it has been determined that the host vehicle 11 will encroach on the obstacle 15, the microprocessor 20 applies the maximum allowable braking force to the host vehicle 11. Since the brake controller 24 controls a braking torque in order to control the braking force exerted by each brake 26, the control target value for each wheel is issued from the microprocessor 20 to the brake controller 24 as a braking torque $Ti^{com}$, which is expressed as shown in the aforementioned equation (25). If a braking force was acting on the host vehicle 11 at the detection time $t_0$, the braking force already acting on the host vehicle 11 is subtracted from the calculated maximum allowable braking force and the difference is applied as a supplemental braking force. When the braking forces are controlled to the maximum braking force that can be exerted by the tires, the tires substantially lose their ability to support (exert) lateral forces and any attempt to control the front wheel steering angle has very little effect on the vehicle behavior. The reason the tires cannot exert lateral forces is that the maximum grip (traction) force that can be obtained from the tires is consumed in exerting the braking forces (the operating point on the friction circle for the tire is in the braking force direction (i.e., along the circumferential direction of the tire)).

In step S108, the preceding object avoidance path setting section 30 discards the data comprising the calculated time series of front wheel steering angles δ stored in the buffer memory 39 and the microprocessor 20 aborts the execution of the avoidance steering control executed by the steering control section 32. These two actions are taken because, when step S108 has been reached, the avoidability determining section 38 has already determined in step S105 that the host vehicle 11 cannot avoid the obstacle 15 using the avoidance path calculated by the avoidance path calculating section 37. Furthermore, since control has been executed in step S107 to apply the maximum braking force that can be supported by the tires against the host vehicle 11, the host vehicle 11 will not turn anyway even if an attempt is made to control the vehicle behavior by controlling the front wheel steering angle. By controlling the braking force to the maximum braking force that can be supported by the tires, the kinetic energy of the host vehicle 11 is lowered.

Figure 7:
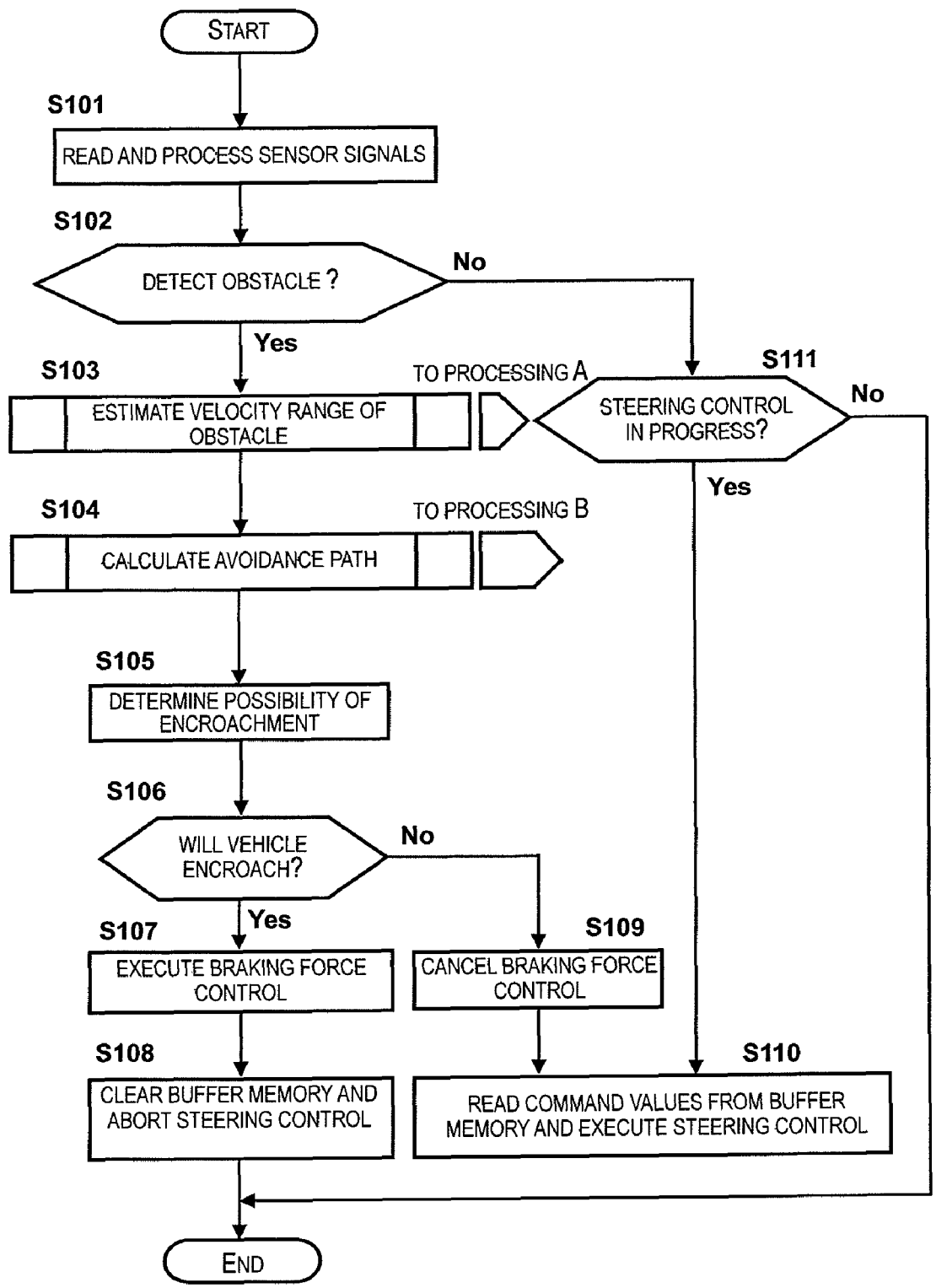
FIG. 7 is a flowchart showing the control processing executed by the avoidance actuation amount calculating unit.

The processing of the flowchart shown in FIG. 7 ends after the preceding object avoidance path setting section 30 discards the front wheel steering angle δ data stored in the buffer memory 39 and the microprocessor 20 aborts the avoidance steering control executed by the steering control section 32.

As mentioned previously, the processing of the flowchart shown in FIG. 7 is executed repeatedly while the host vehicle 11 is traveling and an avoidance path for avoiding the obstacle 15 is calculated again in each cycle. Therefore, the system will not remain idle without executing an avoidance operation with respect to the obstacle 15. In a later cycle of the flowchart shown in FIG. 7, avoidance of the obstacle 15 will be carried out by the execution of step S109 or step S110.

Step S109 is executed when the avoidability determining section 38 has determined in step S105 that the obstacle 15 can be avoided using the avoidance path calculated by the avoidance path calculating section 37. More specifically, in step S109, the microprocessor 20 cancels the application of the maximum allowable braking force against the host vehicle 11 (if a braking force was being applied to the host vehicle 11 at the detection time t0, the supplemental braking force is canceled) because it has been determined that the host vehicle 11 will not encroach on the estimated arrival region A of the obstacle 15 if the calculated avoidance path is executed from the current time t0 until the end of the prescribed amount of time $T_{after}$. Thus, the microprocessor 20 ends the state in which only a braking force is applied to the host vehicle 11 and the host vehicle 11 is not turned by steering. In turn, the microprocessor 20 calculates braking torques $Ti^{com}$ for achieving the braking forces that were applied to each wheel of the host vehicle 11 at the detection time $t_0$ and sends the braking torques $Ti^{com}$ to the brake controller 24 as braking control target values (commands) (if a braking force was not being applied to the host vehicle 11 at the detection time $t_0$, the microprocessor 20 executes steering control only).

In step S110, the microprocessor 20 starts execution of the avoidance path calculated by the avoidance path calculating section 37 by sending a signal to the vehicle motion control unit 13 instructing the vehicle motion control unit 13 to start reading the time series data for the front wheel steering angle δ stored in the buffer memory 39. In response to the signal, the steering control section 32 executes steering control such that the host vehicle 11 avoids the obstacle 15. Since the processing of step S109 has cancelled the supplemental maximum braking force control, the host vehicle 11 achieves a state in which the braking force on which the avoidance path calculation was based (i.e., the braking force that was acting on the host vehicle 11 at the detection time $t_0$) is being exerted against the vehicle. The host vehicle 11 can then be made to follow the avoidance path calculated by the avoidance path calculating section 37 by executing the front wheel steering angles δ contained in the time series data.

Step S111 is executed when an obstacle is not detected in step S102. In step S111, the microprocessor 20 determines if steering control is being executed by the vehicle motion control unit 13 (i.e., if command values are stored in the buffer memory 39 and steering angle control is in progress).

If steering angle control is not being executed, the microprocessor 20 immediately ends the processing because an obstacle requiring avoidance control does not exist in the vicinity of the host vehicle 11. If steering angle control is being executed, then there is a possibility that the steering angle control executed in order to avoid an obstacle 15 existing near the host vehicle 11 has caused the orientation of the host vehicle 11 to change such that the obstacle 15 is out of the field of view of the cameras 16 and cannot be detected. In such a case, the microprocessor 20 proceeds to step S110. By proceeding to step S110, the steering angle control that is currently in progress is continued and the steering angle control corresponding to the command values stored in the buffer memory 39 will be continued. If the buffer memory 39 is empty (i.e., if no stored data exists), then all of the front wheel steering angles δ of the calculated time series have been executed and, thus, it can be concluded that the host vehicle 11 has avoided the obstacle 15 and is traveling appropriately on the road 14. Therefore, if the buffer memory 39 is empty, the microprocessor 20 merely ends the processing. The obstacle avoidance control system 10 executes collision avoidance control by repeating the control processing described heretofore once per prescribed control cycle.

A specific example of the operation of the obstacle avoidance control system 10 will now be explained.

FIG. 10 shows three graphs exemplifying the movement state of the obstacle 15 (in these examples, a walking pedestrian) occurring after the situation shown in FIG. 5. The horizontal axis indicates the time t and the vertical axis indicates the movement velocity $v_p$ of the obstacle 15.

Case 1 is an example in which the obstacle 15 continues to walk at the velocity $v_{p0}$ detected at the detection time $t_0$. Case 2 is an example in which the obstacle 15 notices the approaching vehicle 11 while crossing the road 14 and changes from a walking state to a running state. Case 3 is an example in which the obstacle 15 is surprised by the approaching vehicle 11 while crossing the road 14 and stops walking, remaining stopped in the same spot.

FIGS. 13 to 15 illustrate the details of the control executed in each of the cases, respectively. In each of FIGS. 13 to 15, the positions of the host vehicle 11 and the obstacle 15, the obstacle arrival region at the time when the avoidance path calculation ended, and the calculated avoidance path (if a path avoiding a collision was calculated) are shown at the time $t_0$ when the system first detected the obstacle 15 and at the later times $t_1$ and $t_2$. In FIGS. 13 to 15, illustration (a) shows the situation at the time $t_0$ (detection time), illustration (b) shows the situation at the time $t_1$, and illustration (c) shows the situation at the time $t_2$. In FIGS. 13 to 15, of the estimated arrival regions calculated based on the predicted movement state (see FIG. 6) from the respective detection time (see FIG. 7), the estimated arrival region A shown is the estimated arrival region A corresponding to the point in time of avoidance (point in time when avoidance time $T_p$ has elapsed since detection). Meanwhile, the obstacle 15 is shown in the position where it will exist at each respective time (each detection time). A situation could occur in which, as time passes, the time until the host vehicle 11 reaches the position of the obstacle 15 (in the first embodiment, the time until the X coordinate of the host vehicle 11 becomes equal to the X coordinate of the obstacle 15) becomes shorter. In a situation where the time until the host vehicle 11 reaches the object 15 becomes shorter over time, the estimated arrival region A becomes smaller over time as shown in illustrations (b) and (c) in FIG. 13, even if the obstacle 15 is assumed to maintain the same movement state.

In all of the cases (shown in FIGS. 13 to 15), at the time $t_0$ immediately after the obstacle 15 is detected, the movement velocity range is estimated to be wide and the estimated arrival region A stretches across the entire width of the street because the state of the obstacle 15 is unknown. The estimated arrival region A is calculated based on the widest possible velocity range ($-v^R_A \leq v_p \leq v^R_A$) (see FIG. 3). Therefore, since it is impossible to calculate an avoidance path that will not encroach on the estimated arrival region A, a braking control exerting the maximum possible braking force is executed (see step S7) and the velocity (speed) of the host vehicle 11 decreases from the velocity $v_{C0}$ at the time $t_0$ the velocity $v_{C1}$ at the time $t_1$.

Figure 11:
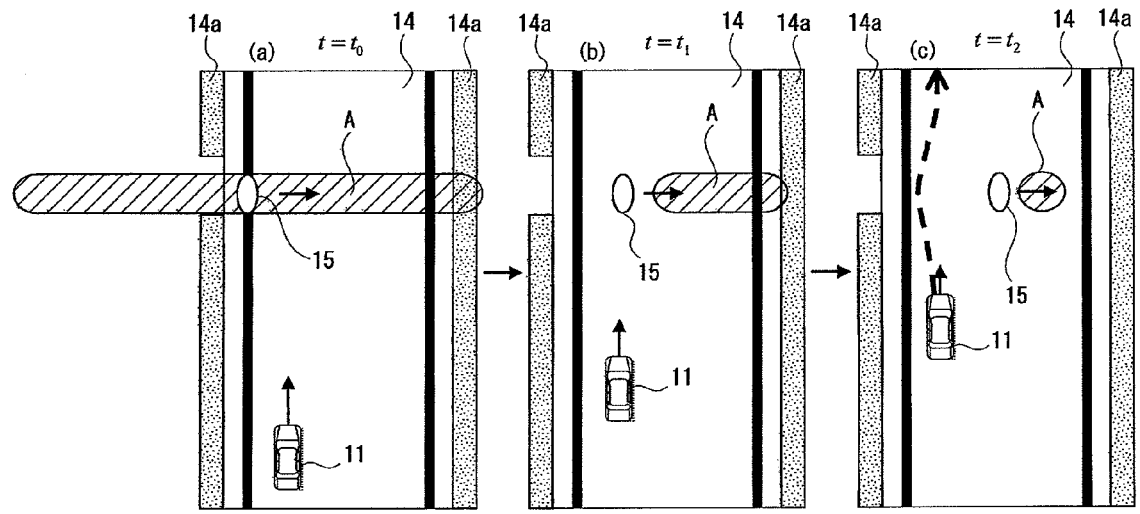
FIG. 11 is a schematic top plan view of the host vehicle traveling on a road with notations illustrating Case 1 of FIG. 10, with illustration (a) showing the situation at the time t0 (detection time), illustration (b) showing the situation at the time t1, and illustration (c) showing the situation at the time t2.

In case 1 at the time $t_1$, the system has determined that the obstacle 15 is an adult person who is moving rightward, but the system is still unable to determine if the person is walking or running. Therefore, the estimated arrival region A is calculated based on the estimated velocity range $v^S_A \leq v_p \leq v^R_A$ (see FIG. 3). Meanwhile, at the time $t_2$ for an adult person, the estimated arrival region A is calculated based on the estimated velocity range $v^S_A \leq v_p \leq v^W_A$ (see FIG. 3) because the system has determined that the obstacle 15 is an adult walking rightward. At the time t1, an avoidance path utilizing steering cannot be found and the braking control is continued, thus further decreasing the speed of the host vehicle 11. At the time $t_2$, the speed of the host vehicle 11 has been decreased to a velocity $v_{C2}$ and the system has successfully calculated an avoidance path that can avoid an estimated arrival region A calculated based on the obstacle velocity range $v^S_A \leq v_p \leq v^W_A$ and the vehicle velocity $v_{C2}$. In the example shown in FIG. 11, the obstacle 15 passes in front of the host vehicle 11 and steering control is executed to as to realize an avoidance path that passes by the rear of the obstacle 15.

Figure 12:
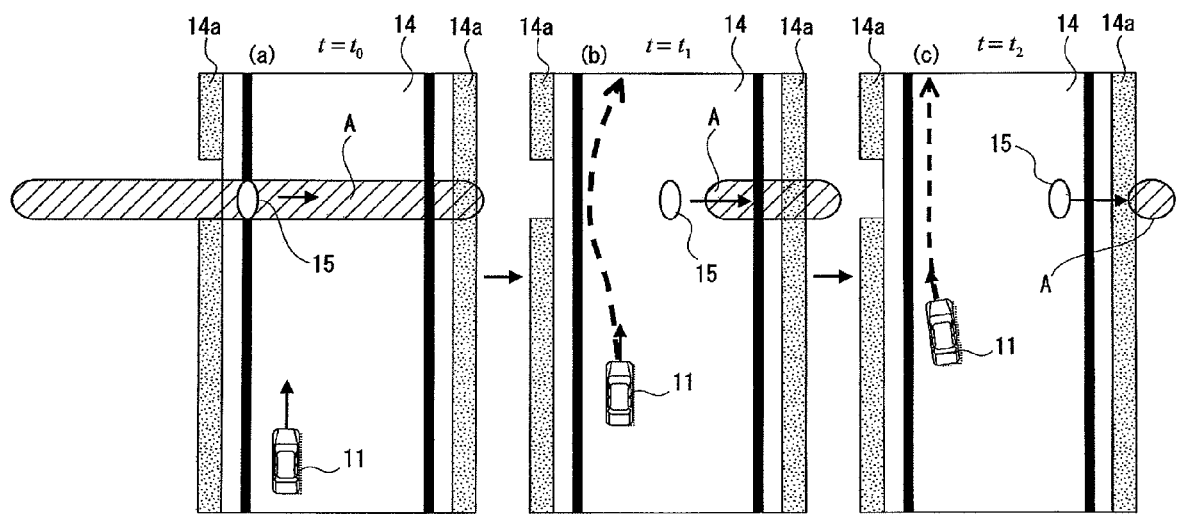
FIG. 12 is a schematic top plan view of the host vehicle traveling on a road with notations illustrating Case 2 of FIG. 10, with illustration (a) showing the situation at the time t0

In case 2 at the time $t_1$, the system has determined that the obstacle 15 is an adult person who is moving rightward, but the system is still unable to determine if the person is walking or running. Therefore, the estimated arrival region A is calculated based on the estimated velocity ran range $v^S_A \leq v_p \leq v^R_A$ (see FIG. 3). Meanwhile, at the time $t_2$, system has determined that the obstacle 15 is an adult running rightward and the estimated arrival region A is calculated based on the estimated velocity range $v^W_A \leq v_p \leq v^R_A$ (see FIG. 3). In the example shown in FIG. 12, the system calculates an avoidance path that passes behind the obstacle 15 because the obstacle 15 is running and has already passed in front of the host vehicle 11 at the time $t_1$. Therefore, the system shifts to steering control (steps S109 and S110) at the time $t_1$ and accomplishes the avoidance of the obstacle 15.

In case 3 at the time $t_1$, the system determines that the obstacle 15 is an adult who is not moving and calculates the estimated arrival region A based on the velocity range $-v^S_A \leq v_p \leq v^S_A$ (see FIG. 3). At the time $t_1$, the estimated arrival region A shrinks because the obstacle 15 is stationary and the system calculates an avoidance path that passes in front of the obstacle 15. Thus, steering control in the rightward direction starts at the time t1 and the steering control steers the host vehicle 11 such that the host vehicle 11 avoids the obstacle 15 by passing in front of the obstacle 15.

The obstacle avoidance control system 10 in accordance with the first embodiment avoids a detected obstacle 15 by estimating the movement state of the obstacle 15, calculating an estimated arrival region A of the obstacle 15 based on the estimated movement state, and controlling the host vehicle 11 such that the host vehicle 11 follows an avoidance path that does not encroach on the estimated arrival region A. As a result, the obstacle avoidance control system 10 enables the host vehicle 11 to avoid an obstacle 15 in a reliable fashion even when the obstacle 15 is not moving at a constant velocity.

The obstacle avoidance control system 10 in accordance with the embodiment 1 is configured to select an appropriate control method in accordance with the observed behavior of the obstacle 15 even when it cannot accurately predict the movement of the obstacle 15. As a result, the obstacle avoidance control system 10 accomplishes an avoidance control that is suited to the actual movement of the obstacle 15 and enables the host vehicle 11 to avoid the obstacle 15 in a reliable fashion.

In the first embodiment, the braking force control executed by the braking force control section 34 is contrived to avoid the obstacle 15 by adding a supplemental braking force to the braking force exerted against the host vehicle 11 due to a brake operation performed by the driver, and the avoidance path used by the avoidance control is calculated based on the assumption that a braking force resulting from a brake operation by the driver is acting on the host vehicle 11. However, the invention is not limited to such an arrangement. For example, it is also acceptable to configure the system such that when it calculates an avoidance path, it takes into account all possible states from a state in which a braking force is not acting on the host vehicle 11 to a state in which the maximum possible braking force is being exerted against the host vehicle 11. In such a case, the system can be configured such that when it executes the calculated avoidance path in step S110, the brake controller 24 of the vehicle motion control unit 13 decreases the braking force acting on the host vehicle 11, i.e., cancels the braking control executed by the driver, in an appropriate manner before the steering control section 32 executes the steering control.

Second Embodiment

A second embodiment of an obstacle avoidance control system 100 in accordance with the present invention will now be explained with reference to FIGS. 14 to 17. The obstacle avoidance control system 100 of the second embodiment is basically the same as the obstacle avoidance control system 10 of the first embodiment, except that the avoidance control executed in order to avoided a detected obstacle 15 involves braking control only. Since the constituent features and operations of the obstacle avoidance control system 100 are the basically the same as those of the obstacle avoidance control system 10 of the first embodiment, detailed descriptions of the constituent features and operations that are the same are omitted for the sake of brevity.

FIG. 14 is a simple top plan view illustrating a vehicle 110 in which an obstacle avoidance control system 100 in accordance with the second embodiment is employed. FIG. 15 is a block diagram of the obstacle avoidance control system 100. As shown in FIG. 15, the obstacle avoidance control system 100 differs from the avoidance system 10 in that the vehicle motion control unit 13 is not provided with a steering control section 32. Instead, the vehicle motion control unit 13 comprises only the braking force control section 34.

As shown in FIG. 14, the obstacle avoidance control system 100 is provided with a brake pedal 40, a master cylinder 41, and a brake pressure sensor 42.

The brake pedal 40 is a pedal configured and arranged for a driver to depress with a foot in order to execute braking control with respect to the host vehicle 110. The master cylinder 41 serves to convert a depression force exerted against the brake pedal 40 into a hydraulic pressure that actuates the brakes 26. The braking force sensor 42 serves to detect the pressure of the master cylinder and send a signal indicating the brake control amount executed by the driver (braking force resulting from the depression force the driver exerted against the brake pedal 40) to the vehicle information processing section 28. Based on the signals from the brake pressure sensor 42 and the steering angle sensor 21, the vehicle information processing section 28 generates information regarding the brake control amount and steering control amount acting on the host vehicle 110 and stores the control amounts in the memory 31.

The steps executed by the obstacle avoidance control system 100 in order to avoid an obstacle 15 will now be explained with reference to the flowchart shown in FIG. 16. Similarly to the first embodiment, the flowchart of FIG. 16 is based on the assumption of a situation like that illustrated in FIG. 5 and the flowchart is executed repeatedly while the host vehicle 110 is traveling.

Obstacle Avoidability Processing

The processing of step S201 is executed by the acquired information processing section 27 (e.g., the vehicle information processing section 28, the obstacle information processing section 29, and the road boundary information processing section 35). The acquired information processing section 27 produces required information based on the output signals from the cameras 16 and the sensors 17 to 19 and stores the information in the memory 31. This step S201 is basically the same as the step S101 of the first embodiment, except that information regarding the front wheel steering angle δ and the brake pressure P acting on the host vehicle 110 at the detection time $t_0$ is also generated. The information is converted as appropriate to correspond to a set coordinate system In step S202, the microprocessor 20 determines if it is necessary to execute avoidance control based on the information from the vehicle information processing section 28, the obstacle information processing section 29, and the road boundary information processing section 35. The second embodiment is configured to determine if the situation requires executing avoidance control based not only on the degree of convergence of the host vehicle 110 with respect to the obstacle 15 but also on the braking control executed by the driver.

More specifically, the microprocessor 20 determines that the situation requires avoidance control when all of the equations (26) to (28) shown below are satisfied. In the equation, terms $x_p$ and $y_p$ are coordinates for the position of the obstacle 15 at the detection time $t_0$, term $\Delta Y$ is a threshold value for the separation between the host vehicle 110 and the obstacle 15 in the Y direction, term $v_C$ is the velocity of the host vehicle 110 in the X direction, term P is the brake pressure (value detected by the brake pressure sensor 42) resulting from the brake operation performed by the driver at the detection time $t_0$, and term $P_{ON}$ is a brake pressure threshold value. Since the host vehicle 110 is moving at the velocity $v_C$ in the X direction, the degree of convergence of the host vehicle 110 toward the obstacle 15 along the X direction can be expressed in terms of the time until the host vehicle 110 will reach the position of the obstacle 15. $TTC_{min}$ is a threshold value given in terms of time.

$$(x_p - x)/v_C \leq TTC_{min} \tag{26}$$

$$|y_p - y| \leq \Delta Y \tag{27}$$

$$P \geq P_{ON} \tag{28}$$

In step S203, if the microprocessor 20 has determined that avoidance control is necessary, then it proceeds to step S204 to execute the avoidance control. Conversely, if it has determined that avoidance control is not necessary, the microprocessor 20 proceeds to step S209 so as not to execute avoidance control.

In step S204, since it has been determined that avoidance control is necessary, the obstacle arrival region estimating section 36 estimates the velocity range of the detected obstacle 15 in preparation for calculating the avoidance path. Since the processing executed in order to set the velocity range is the same as in the step S103 of the flowchart shown in FIG. 7 of the first embodiment, a detailed explanation thereof is omitted here for the sake of brevity.

In step S205, the preceding object avoidance path setting section 30 calculates an avoidance path. In the second embodiment, the calculation of the avoidance path by the preceding object avoidance path setting section 30 is handled differently than in step S104 of the flowchart shown in FIG. 7 of the first embodiment. Namely, in the second embodiment, the avoidance path calculation is based on the assumption that both the steering actuation amount (front wheel steering angle $\delta_0$ detected by the steering angle sensor 21) and the brake actuation amount (brake pressure $P_0$ detected by the brake pressure sensor 42) acting on the host vehicle 110 at the detection time $t_0$ are maintained (held constant) during the avoidance control.

The preceding object avoidance path setting section 30 calculates the avoidance path using the same vehicle model as is used in the first embodiment, which is described in equations (10) to (15). In order to calculate the avoidance path using the vehicle model, the value of each component of the input vector u must be determined. The front wheel steering angle δ component of the input vector u is fixed at a constant value because, as mentioned previously, the calculation is based on the assumption that the front wheel steering angle $\delta_0$ detected at the detection time $t_0$ is maintained. The reason for this assumption is that the obstacle avoidance control system 100 of the second embodiment is not provided with a mechanism for controlling the steering of the host vehicle 110 (steering control section 32) and, thus, the avoidance path calculation is based on the assumption that the driver holds the steering in a constant state. Meanwhile, the braking forces Fi (i=1, 2, 3, 4) applied to the wheels are obtained as a time series signal calculated using the differential equations shown in the equation (29) below, where term Fb (P) is the braking force exerted against the host vehicle 110 due to the pressure P (brake pressure) of the master cylinder 41 resulting from the brake operation performed by the driver, term M is the mass of the host vehicle 110, and term $a_x(0)$ is a measurement value of the acceleration of the host vehicle 110 in the movement direction.

$$F_i = -\omega_b \cdot F_i + \omega_b \cdot F_b(P), \tag{29}$$
$$F_i(0) = \frac{W_i}{\sum W_i} M \cdot a_x(0)$$

Thus, similarly to the first embodiment, the braking force control contrived to exert the maximum allowable braking force can be executed when an avoidance path cannot be calculated, and the braking force generated by the driver's operation of the brake pedal can be left in effect when the braking force control is stopped because an avoidance path has been calculated.

As described previously, a travel path can be calculated by defining the input vector u and integrating the vehicle model equations. In the second embodiment, a travel path is calculated in this manner and treated as an avoidance path in the subsequent processing steps.

In step S205, the avoidability determining section 38 determines if the host vehicle 110 will encroach on the estimated arrival region A of the obstacle 15 if it actually follows the calculated avoidance path by the preceding object avoidance path setting section 30. Then, the microprocessor 20 proceeds to step S207. The processing executed in step S206 is basically the same as the processing executed in step S105 of the flowchart shown in FIG. 7 of the first embodiment.

In step S207, the microprocessor 20 proceeds to step S208 if the avoidability determining section 38 has determined that the host vehicle 110 will encroach on the estimated arrival region A and to step S209 if the avoidability determining section 38 has determined that the host vehicle 110 will not encroach. The processing executed in step S207 is basically the same as the processing executed in step S106 of the flowchart shown in FIG. 7 of the first embodiment.

In step S208, the microprocessor 20 instructs the braking force control section 34 to add a supplemental braking force such that a braking force larger than the braking force acting on the host vehicle 110 at the detection time $t_0$ is exerted against the host vehicle 110. It is also acceptable to configure the system such that, similarly to the first embodiment, the maximum allowable braking force is exerted against the host vehicle 110. After the supplemental braking force is added, the processing of the flowchart shown in FIG. 16 ends.

If it determines in step S202 that avoidance control is not necessary, or if it determines in step S206 that the host vehicle 110 will not encroach on the estimated arrival region A of the obstacle 15 if the calculated avoidance path is executed, then the microprocessor 20 ends the processing of the flowchart shown in FIG. 16 immediately after aborting the braking control (if the microprocessor 20 is already executing braking control). The reason for structuring the control in this manner is as follows. Namely, if it has been determined that avoidance control is not necessary, then there is no risk of the host vehicle 110 reaching the position of the obstacle 15 even if it continues in the same travel state as it had at the detection time $t_0$ and, thus, it is not necessary for the microprocessor 20 to execute braking control to add a supplemental braking force. Meanwhile, if it has been determined that the host vehicle 110 will not encroach on the estimated arrival region A of the obstacle 15 if the calculated avoidance path is executed, then a supplemental braking force added by braking control executed by the microprocessor 20 will inhibit the ability of the host vehicle 110 to follow the calculated avoidance path because the avoidance path is calculated based on the assumption that the steering actuation amount and the brake actuation amount acting on the host vehicle 110 at the detection time $t_0$ are maintained (do not change).

Since the steering actuation amount and the brake control amount are calculated each time the processing of the flowchart shown in FIG. 16 is repeated, the host vehicle 110 can be controlled so as to follow an avoidance path that is appropriate in view of the driving operations performed by the driver.

A specific example of the operation of the obstacle avoidance control system 100 will now be explained.

FIG. 17 illustrates a case in which an obstacle 15 similar to that of the first embodiment enters the road 14 and its movement state changes similarly to Case 3 of the first embodiment (see FIG. 13). Additionally, in the case shown in FIG. 17, it is assumed that the driver recognizes the obstacle 15 and then depresses the brake pedal 40 and turns rightward. In FIG. 17, illustration (a) shows the situation at the time $t_0$ (detection time), illustration (b) shows the situation at the time $t_1$, and illustration (c) shows the situation at the time $t_2$ (see FIG. 13).

At the time $t_0$ immediately after the obstacle 15 is detected, the movement velocity range is estimated to be wide and the estimated arrival region A stretches across the entire width of the street because the state of the obstacle 15 is unknown. Thus, the estimated arrival region A is calculated based on the widest possible velocity range $(-v^R_A \leq v_p \leq v^R_A)$ (see FIG. 3). Therefore, since it is impossible to calculate an avoidance path that will not encroach on the estimated arrival region A, a braking control adding a supplemental braking force is executed and the velocity (speed) of the host vehicle 11 decreases from the velocity $v_{C0}$ at the time $t_0$ the velocity $v_{C1}$ at the time $t_1$.

At the time $t_1$, the system determines that the obstacle 15 is an adult who is not moving and then the system calculates the estimated arrival region A based on the velocity range $-v^S_A \leq v_p \leq v^S_A$ (see FIG. 3). Although the estimated arrival region A is smaller at the time $t_1$ because the obstacle 15 has stopped moving, an avoidance path cannot be found under the conditions of the aforementioned assumption and deceleration (braking) of the host vehicle 110 is continued.

At the time $t_2$, the speed of the host vehicle 11 has been decreased to a velocity $v_{C2}$ and the system has successfully calculated an avoidance path that can avoid an estimated arrival region A calculated based on the obstacle velocity range $v^S_A \leq v_p \leq v^W_A$ and the vehicle velocity $v_{C2}$. Thus, since the host vehicle 110 will not encroach on the estimated arrival region A of the obstacle 15 if it follows the avoidance path, the braking control executed by the microprocessor 20 is stopped. As a result, the host vehicle 110 changes from a state in which it is moving straight forward regardless of the front wheel steering angle $\delta_0$ because the added supplemental braking force has diminished the ability of the host vehicle 110 to turn to a state in which it can avoid the obstacle 15 by following the calculated avoidance path because the termination of the supplemental braking force has enabled the host vehicle 110 to turn in accordance with the front wheel steering angle $\delta_0$. Furthermore, the calculated avoidance path is appropriate because it was calculated based on the assumption that the steering angle is $\delta_0$ and the braking force is based what it was before the supplemental braking force was added.

With an obstacle avoidance control system 100 in accordance with the second embodiment, the avoidance braking force control executed by the braking force control section 34 enables the host vehicle 110 to avoid an obstacle 15 in a reliable fashion.

The obstacle avoidance control system enables a vehicle to reliably avoid an obstacle because it makes the vehicle follow an avoidance path that is calculated based on a range of movement speeds of the obstacle.

The obstacle avoidance control system enables a vehicle to reliably avoid an obstacle by making the vehicle follow an avoidance path that is calculated based on a range of movement speeds of the obstacle.

In the obstacle avoidance control system, when the estimated arrival region of the obstacle cannot be avoided with the calculated avoidance path, the vehicle is decelerated and the estimated arrival region is reset based on the accumulated information regarding the obstacle. Consequently, over time, the estimated arrival region becomes more accurate and decreases in size. After the estimated arrival region becomes smaller, a feasible avoidance path can be calculated and the obstacle can be avoided in a reliable fashion. Since the estimated arrival region is revised consecutively using the movement history of the obstacle, the estimated arrival region can be calculated so as to appropriately reflect changes in the behavior of the obstacle and a collision avoidance control that responds rapidly to changes in the behavior of the obstacle can be accomplished. Furthermore, since the vehicle is decelerated when the estimated arrival region of the obstacle cannot be avoided with the calculated avoidance path, the kinetic energy of the vehicle can be reduced.

With the obstacle avoidance control system, the estimated arrival region can be calculated easily because the calculation is based on the movement velocity of the obstacle, which is an easily estimated parameter.

In the obstacle avoidance control system, the estimated arrival region is calculated using a plurality of preset velocity ranges. Thus, since the movement state and estimated arrival region of the obstacle can be set based on a statistical classification, an even more reliable obstacle avoidance control can be accomplished.

In the obstacle avoidance control system, when an obstacle has just been detected and there is little information regarding the obstacle, the movement state and estimated arrival region are set using all of the velocity regions together as the velocity range. As a result, the obstacle can be avoided even more reliably.

The obstacle avoidance control system does not execute braking force control if the driver is not performing a brake operation. As a result, it is possible to prevent a situation in which the braking force control is started in opposition to the intent of the driver and causes the driver to experience a feeling that something is odd about the vehicle behavior.

The obstacle avoidance control system can avoid an obstacle using an appropriate combination of braking force control and steering control when the obstacle exists in a position that cannot be avoided with braking alone.

The obstacle avoidance control system executes avoidance control using an avoidance path calculated within the traction limit of the tires. As a result, a more reliable obstacle avoidance control can be achieved.

The obstacle avoidance control system executes obstacle avoidance control of the vehicle while allowing a braking force corresponding to a brake operation performed by the driver to act on the vehicle. As a result, an avoidance control that reflects the intent of the driver to decelerate can be accomplished and the driver can be prevented from experiencing a feeling that something is odd about the vehicle behavior.

The obstacle avoidance control system calculates the avoidance path based on an assumption that the braking force is lowered until it reaches zero and, when the avoidance path is executed, the system lowers the braking force as necessary so that the lateral forces of the tires can be maximized and the vehicle can avoid the obstacle with lateral movement. As a result, a more reliable obstacle avoidance control can be achieved.

The obstacle avoidance control system calculates the avoidance path based on the assumption that the steering actuation amount imposed by the driver is held constant. As a result, an avoidance control that respects the driver's intent regarding steering can be accomplished.

The obstacle avoidance control system can calculate the avoidance path using a computation that serves to optimize an evaluation value obtained from an evaluation function. As a result, a vehicle travel path that is the best suited for avoiding a collision can be set as the avoidance path and a more reliable obstacle avoidance control can be achieved.

The obstacle avoidance control system can make the vehicle follow an avoidance path that reliably avoids a collision regardless of driving operations performed by the driver by executing both braking force control and automatic control (separate from operation by the driver) of the steering angle of the steered wheels. As a result, a more reliable obstacle avoidance control can be achieved.

The obstacle avoidance control system sets the estimated arrival region based on an attribute of the obstacle. As a result, the accuracy of the estimated arrival region can be increased and a more reliable obstacle avoidance control can be achieved.

The obstacle avoidance control system detects a road boundary and executes control to prevent the vehicle from departing from the road in addition to executing control to avoid an obstacle. As a result, an avoidance control can be accomplished which takes into account the risk of road departure that accompanies avoiding an obstacle.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with a vehicle brake control system of the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An obstacle avoidance path computing apparatus comprising:
   a microprocessor including
      a preceding object detecting section configured to detect a preceding object state and a movement velocity of a preceding object existing in front of a host vehicle as preceding object information;
      a host vehicle information detecting section configured to detect a host vehicle traveling state as host vehicle information;
      a preceding object arrival region estimating section configured to calculate an estimated arrival region representing a plurality of possible locations within which the preceding object could arrive at a single moment in time after a prescribed amount of time has elapsed since the preceding object information was detected, based on an estimated attribute of the preceding object from the preceding object state and the movement velocity of the preceding object, the estimated arrival region being larger than the preceding object in a direction transverse to a current host vehicle traveling direction; and a preceding object avoidance path setting section configured to calculate an avoidance path that will not encroach on the estimated arrival region based on the preceding object information and the host vehicle information.

2. An obstacle avoidance path computing apparatus comprising:

a microprocessor including a preceding object detecting section configured to detect a preceding object state and a movement velocity of a preceding object existing in front of a host vehicle as preceding object information;

a host vehicle information detecting section configured to detect a host vehicle traveling state as host vehicle information;

a preceding object arrival region estimating section configured to calculate an estimated arrival region within which the preceding object could arrive after a prescribed amount of time has elapsed since the preceding object was detected, based on an estimated attribute of the preceding object from the preceding object state and the movement velocity of the preceding object; and a preceding object avoidance path setting section configured to calculate an avoidance path that will not encroach on the estimated arrival region based the preceding object information and the host vehicle information, the preceding object arrival region estimating section being configured to calculate the estimated arrival region based on a maximum velocity and a minimum velocity of a velocity range that corresponds to the attribute of the preceding object and that includes the movement velocity of the preceding object.

3. An obstacle avoidance path computing apparatus comprising:

a microprocessor including a preceding object detecting section configured to detect a preceding object state and a movement velocity of a preceding object existing in front of a host vehicle as preceding object information;

a host vehicle information detecting section configured to detect a host vehicle traveling state as host vehicle information;

a preceding object arrival region estimating section configured to calculate an estimated arrival region within which the preceding object could arrive after a prescribed amount of time has elapsed since the preceding object was detected, based on an estimated attribute of the preceding object from the preceding object state and the movement velocity of the preceding object; and a preceding object avoidance path setting section configured to calculate an avoidance path that will not encroach on the estimated arrival region based the preceding object information and the host vehicle information, the preceding object arrival region estimating section being further configured to calculate the estimated arrival region using a widest velocity range existing among a set of previously stored velocity ranges that correspond to the attribute of the preceding object when the preceding object arrival region estimating section first calculates the estimated arrival region.

4. The obstacle avoidance path computing apparatus as recited in claim 1, wherein the host vehicle information detecting section is further configured to detect a steering angle of the host vehicle as part of the host vehicle information; and the preceding object avoidance path setting section is further configured to calculate the avoidance path using the steering angle detected by the host vehicle information detecting section.

5. An obstacle avoidance path computing apparatus comprising:

a microprocessor including a preceding object detecting section configured to detect a preceding object state and a movement velocity of a preceding object existing in front of a host vehicle as preceding object information;

a host vehicle information detecting section configured to detect a host vehicle traveling state as host vehicle information;

a preceding object arrival region estimating section configured to calculate an estimated arrival region within which the preceding object could arrive after a prescribed amount of time has elapsed since the preceding object was detected, based on an estimated attribute of the preceding object from the preceding object state and the movement velocity of the preceding object; and a preceding object avoidance path setting section configured to calculate an avoidance path that will not encroach on the estimated arrival region based the preceding object information and the host vehicle information, the host vehicle information detecting section being further configured to detect a steering angle of the host vehicle as part of the host vehicle information, and the preceding object avoidance path setting section being further configured to calculate the avoidance path using the steering angle detected by the host vehicle information detecting section and to calculate the avoidance path with a resultant force that is smaller than a maximum value of a tire grip force of the host vehicle, the resultant force being a sum of an acceleration force, a deceleration force, and a lateral force based on the steering angle.

6. The obstacle avoidance path computing apparatus as recited in claim 1, wherein the host vehicle information detecting section is further configured to detect a braking force applied to the host vehicle as part of the host vehicle information; and the preceding object avoidance path setting section is further configured to calculate the avoidance path using the braking force detected by the host vehicle information detecting section.

7. An obstacle avoidance path computing apparatus comprising:

a microprocessor including a preceding object detecting section configured to detect a preceding object state and a movement velocity of a preceding object existing in front of a host vehicle as preceding object information;

a host vehicle information detecting section configured to detect a host vehicle traveling state as host vehicle information;

a preceding object arrival region estimating section configured to calculate an estimated arrival region within which the preceding object could arrive after a prescribed amount of time has elapsed since the preceding object was detected, based on an estimated attribute of the preceding object from the preceding object state and the movement velocity of the preceding object; and a preceding object avoidance path setting section configured to calculate an avoidance path that will not encroach on the estimated arrival region based the preceding object information and the host vehicle information, the preceding object avoidance path setting section being further configured to calculate a plurality of travel paths that can be feasibly followed by the host vehicle to avoid the preceding object, and the preceding object avoidance path setting section being further configured to evaluate each of the travel paths to select one of the travel paths as the avoidance path based on a degree to which the host vehicle will approach the estimated arrival region of the preceding object if that travel path is adopted.

8. The obstacle avoidance path computing apparatus as recited in claim 1, further comprising a road boundary detecting section configured to detect a road boundary between a travel region in which travel is possible and a non-travel region in which travel is not possible on a road on which the host vehicle is traveling; and the preceding object avoidance path setting section is further configured to calculate the avoidance path taking into account avoidance of the road boundary.

9. An obstacle avoidance control system comprising:

a first microprocessor including a preceding object detecting section configured to detect a preceding object state and a movement velocity of a preceding object existing in front of a host vehicle as preceding object information, a host vehicle information detecting section configured to detect a host vehicle traveling state as host vehicle information, a preceding object arrival region estimating section configured to calculate an estimated arrival region within which the preceding object could arrive after a prescribed amount of time has elapsed since the preceding object was detected, based on an estimated attribute of the preceding object from the preceding object state and the movement velocity of the preceding object; and a preceding object avoidance path setting section configured to calculate an avoidance path that will not encroach on the estimated arrival region based the preceding object information and the host vehicle information; and a second microprocessor including a braking force control section configured to selectively control a braking mechanism to apply a braking force to the host vehicle, the preceding object avoidance path setting section being further configured to calculate the avoidance path for instances in which a braking force control is not being applied to the host vehicle, and the braking force control section being configured to selectively control the braking mechanism as needed such that the avoidance path is followed.

10. The obstacle avoidance control system as recited in claim 9, wherein the preceding object avoidance path setting section is further configured to calculate the avoidance path based on an assumption that a steering actuation amount, detected at the point in time when the preceding object information was detected, remains constant.

11. The obstacle avoidance control system as recited in claim 9, further comprising a steering angle control section configured to control a steering mechanism of the host vehicle, the steering angle control section and the braking force control section being configured to control the steering mechanism and the braking mechanism in a coordinated manner to follow the avoidance path.

12. An obstacle avoidance path computing method comprising:

detecting a preceding object state and a movement velocity of a preceding object existing in front of a host vehicle as preceding object information;

detecting a host vehicle traveling state as host vehicle information;

calculating an estimated arrival region representing a plurality of possible locations within which the preceding object could arrive at a single moment in time after a prescribed amount of time has elapsed since the preceding object information was detected, based on an estimated attribute of the preceding object from the preceding object state and the movement velocity of the preceding object using a microprocessor, the estimated arrival region being larger than the preceding object in a direction transverse to a current host vehicle traveling direction;

calculating an avoidance path that will not encroach on the estimated arrival region based on the preceding object information and the host vehicle information using the microprocessor; and modifying a current host vehicle travel path based on the avoidance path using the microprocessor.

13. An obstacle avoidance path computing method comprising:

detecting a preceding object state and a movement velocity of a preceding object existing in front of a host vehicle as preceding object information;

detecting a host vehicle traveling state as host vehicle information;

calculating an estimated arrival region within which the preceding object could arrive after a prescribed amount of time has elapsed since the preceding object information was detected, based on an estimated attribute of the preceding object from the preceding object state and the movement velocity of the preceding object using a microprocessor;

calculating an avoidance path that will not encroach on the estimated arrival region based on the preceding object information and the host vehicle information using the microprocessor; and modifying a current host vehicle travel path based on the avoidance path using the microprocessor, the calculating of the estimated arrival region being on a maximum velocity and a minimum velocity of a velocity range that corresponds to the attribute of the preceding object and that includes the movement velocity of the preceding object.

14. An obstacle avoidance path computing method comprising:
- detecting a preceding object state and a movement velocity of a preceding object existing in front of a host vehicle as preceding object information;
- detecting a host vehicle traveling state as host vehicle information;
- calculating an estimated arrival region within which the preceding object could arrive after a prescribed amount of time has elapsed since the preceding object information was detected, based on an estimated attribute of the preceding object from the preceding object state and the movement velocity of the preceding object using a microprocessor;
- calculating an avoidance path that will not encroach on the estimated arrival region based on the preceding object information and the host vehicle information using the microprocessor; and
- modifying a current host vehicle travel path based on the avoidance path using the microprocessor,
- the calculating of the estimated arrival region including using a widest velocity range existing among a set of previously stored velocity ranges that correspond to the attribute of the preceding object when first calculating the estimated arrival region.

15. The obstacle avoidance path computing method as recited in claim 12, wherein
- the detecting section of the host vehicle information includes detecting a steering angle; and
- the calculating of the avoidance path uses the steering angle.

16. An obstacle avoidance path computing method comprising:
- detecting a preceding object state and a movement velocity of a preceding object existing in front of a host vehicle as preceding object information;
- detecting a host vehicle traveling state as host vehicle information;
- calculating an estimated arrival region within which the preceding object could arrive after a prescribed amount of time has elapsed since the preceding object information was detected, based on an estimated attribute of the preceding object from the preceding object state and the movement velocity of the preceding object using a microprocessor;
- calculating an avoidance path that will not encroach on the estimated arrival region based on the preceding object information and the host vehicle information using the microprocessor; and
- modifying a current host vehicle travel path based on the avoidance path using the microprocessor,
- the detecting section of the host vehicle information including detecting a steering angle,
- the calculating of the avoidance path using the steering angle, and
- the calculating of the avoidance path resulting in a resultant force that is smaller than a maximum value of a tire grip force of the host vehicle, the resultant force being a sum of an acceleration force, a deceleration force, and a lateral force based on the steering angle.

17. The obstacle avoidance path computing method as recited in claim 12, wherein
- the detecting of the host vehicle information includes detecting a braking force applied to the host vehicle; and
- the calculating of the avoidance path includes using the braking force.

18. An obstacle avoidance path computing method comprising:
- detecting a preceding object state and a movement velocity of a preceding object existing in front of a host vehicle as preceding object information;
- detecting a host vehicle traveling state as host vehicle information;
- calculating an estimated arrival region within which the preceding object could arrive after a prescribed amount of time has elapsed since the preceding object information was detected, based on an estimated attribute of the preceding object from the preceding object state and the movement velocity of the preceding object using a microprocessor;
- calculating an avoidance path that will not encroach on the estimated arrival region based on the preceding object information and the host vehicle information using the microprocessor;
- calculating a plurality of travel paths as possible avoidance paths that can be feasibly followed by the host vehicle to avoid the preceding object;
- evaluating each of the travel paths to select one of the travel paths as the avoidance path based on a degree to which the host vehicle will approach the estimated arrival region of the preceding object if that travel path is adopted; and
- modifying a current host vehicle travel path based on the avoidance path using the microprocessor.

19. The obstacle avoidance path computing method as recited in claim 12, further comprising
- detecting a road boundary between a travel region in which travel is possible and a non-travel region in which travel is not possible on a road on which the host vehicle is traveling,
- the calculating of the avoidance path taking into account avoidance of the road boundary.

20. An obstacle avoidance control method comprising:
- detecting a preceding object state and a movement velocity of a preceding object existing in front of a host vehicle as preceding object information;
- detecting a host vehicle traveling state as host vehicle information;
- calculating an estimated arrival region within which the preceding object could arrive after a prescribed amount of time has elapsed since the preceding object information was detected, based on an estimated attribute of the preceding object from the preceding object state and the movement velocity of the preceding object using a first microprocessor;
- calculating an avoidance path that will not encroach on the estimated arrival region based on the preceding object information and the host vehicle information using the first microprocessor;
- modifying a current host vehicle travel path based on the avoidance path using the first microprocessor; and
- controlling a braking mechanism to apply a braking force to the host vehicle using a second microprocessor,
- the calculating of the avoidance path taking into account instances in which a braking force control is not being applied to the host vehicle, and
- the controlling of the braking mechanism including selectively controlling the braking mechanism as needed such that the avoidance path is followed using the second microprocessor.

21. The obstacle avoidance control method as recited in claim 20, wherein
the calculating of the avoidance path is based on an assumption that a steering actuation amount, detected at the point in time when the preceding object information was detected, remains constant.

22. The obstacle avoidance control method as recited in claim 20, further comprising
controlling a steering mechanism of the host vehicle and the braking mechanism in a coordinated manner to follow the avoidance path using the second microprocessor.

* * * * *